(12) United States Patent
Kataoka et al.

(10) Patent No.: US 12,346,221 B2
(45) Date of Patent: Jul. 1, 2025

(54) CONTROL DEVICE AND NON-TRANSITORY MACHINE READABLE STORAGE MEDIUM

(71) Applicant: OMRON Corporation, Kyoto (JP)

(72) Inventors: Hitoshi Kataoka, Kyoto (JP); Nobuyuki Sakatani, Kyoto (JP); Mitsuhiro Yoneda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 75 days.

(21) Appl. No.: 18/018,430

(22) PCT Filed: Jul. 30, 2021

(86) PCT No.: PCT/JP2021/028435
§ 371 (c)(1),
(2) Date: Jan. 27, 2023

(87) PCT Pub. No.: WO2022/030402
PCT Pub. Date: Feb. 10, 2022

(65) Prior Publication Data
US 2023/0305931 A1    Sep. 28, 2023

(30) Foreign Application Priority Data
Aug. 6, 2020 (JP) ................. 2020-133505

(51) Int. Cl.
*G06F 3/06* (2006.01)
*G06F 11/14* (2006.01)

(52) U.S. Cl.
CPC ........ *G06F 11/1464* (2013.01); *G06F 3/0619* (2013.01); *G06F 3/065* (2013.01);
(Continued)

(58) Field of Classification Search
CPC .... G06F 11/1464; G06F 3/0619; G06F 3/065; G06F 3/067; G06F 11/1451; G06F 11/1461; G05B 19/05
See application file for complete search history.

(56) References Cited

U.S. PATENT DOCUMENTS

| 6,088,694 A | 7/2000 | Burns et al. |
| 6,170,044 B1 * | 1/2001 | McLaughlin ............ G05B 9/03 |
| | | 711/112 |
| 10,055,303 B1 | 8/2018 | Kumar et al. |
| 2002/0169740 A1 | 11/2002 | Korn |

(Continued)

FOREIGN PATENT DOCUMENTS

| CN | 1285061 A | 2/2001 |
| CN | 103592880 A | 2/2014 |

(Continued)

OTHER PUBLICATIONS

International Search Report of PCT/JP2021/028435 dated Oct. 5, 2021 [PCT/ISA/210].

(Continued)

*Primary Examiner* — Francisco A Grullon
(74) *Attorney, Agent, or Firm* — Sughrue Mion, PLLC

(57) ABSTRACT

Information is backed up with a simple configuration. A control device that controls an object, the control device includes: a storage configured to store information controlling the object; and a change detector configured to detect that information in the storage is changed, in which the control device executes backup processing of the information stored in the storage when the change detector detects that the information in the storage is changed during operation.

20 Claims, 27 Drawing Sheets

(52) U.S. Cl.
CPC .......... *G06F 3/067* (2013.01); *G06F 11/1451* (2013.01); *G06F 11/1461* (2013.01)

(56) References Cited

U.S. PATENT DOCUMENTS

| | | | | |
|---|---|---|---|---|
| 2005/0025461 | A1* | 2/2005 | Kato | G11B 27/034 |
| | | | | 386/241 |
| 2008/0086658 | A1 | 4/2008 | Takahasi | |
| 2010/0249956 | A1 | 9/2010 | Bliss et al. | |
| 2012/0102088 | A1* | 4/2012 | Bindal | G06F 11/1461 |
| | | | | 709/203 |
| 2015/0362903 | A1 | 12/2015 | Ono et al. | |
| 2016/0371154 | A1 | 12/2016 | Makimoto | |
| 2017/0083405 | A1* | 3/2017 | Basham | G06F 11/14 |
| 2017/0168903 | A1 | 6/2017 | Dornemann et al. | |
| 2017/0329529 | A1* | 11/2017 | Chopra | G06F 11/1451 |
| 2018/0032404 | A1 | 2/2018 | Komatsu | |
| 2018/0120828 | A1 | 5/2018 | Igawa | |
| 2019/0116021 | A1* | 4/2019 | Tanwar | H04J 3/0673 |
| 2020/0241501 | A1 | 7/2020 | Nakanishi | |
| 2020/0244381 | A1* | 7/2020 | Yoneda | G05B 19/0423 |
| 2020/0364113 | A1* | 11/2020 | Tormasov | G06F 11/1466 |

FOREIGN PATENT DOCUMENTS

| | | |
|---|---|---|
| JP | 2001-527232 A | 12/2001 |
| JP | 2003-167791 A | 6/2003 |
| JP | 2005-202774 A | 7/2005 |
| JP | 2013-50828 A | 3/2013 |
| JP | 2014-146077 A | 8/2014 |
| JP | 2014-174616 A | 9/2014 |
| WO | 2014/174546 A1 | 10/2014 |
| WO | 2016/163455 A1 | 10/2016 |
| WO | 2017/115426 A1 | 7/2017 |
| WO | 2020/036094 A1 | 2/2020 |

OTHER PUBLICATIONS

Written Opinion of PCT/JP2021/028435 dated Oct. 5, 2021 [PCT/ISA/237].
Communication dated Jul. 25, 2024 issued by the European Patent Office in application No. 21854299.1.
Office Action issued Mar. 27, 2025 in Chinese Patent Application No. 202180058900.X.

* cited by examiner

FIG.20
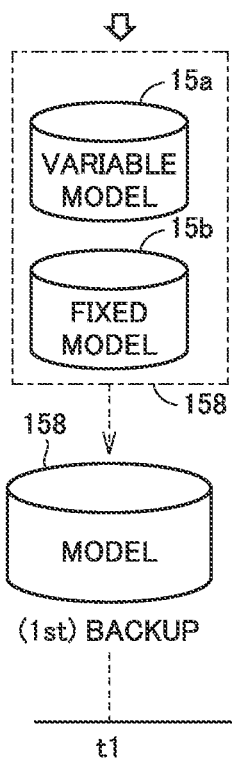
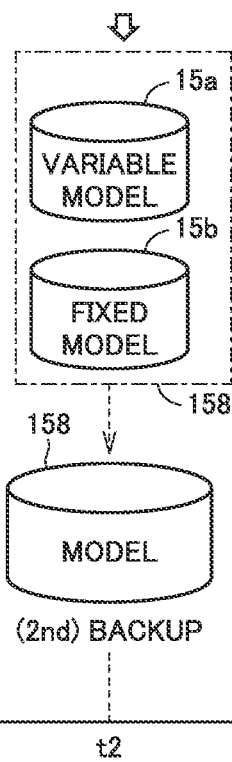
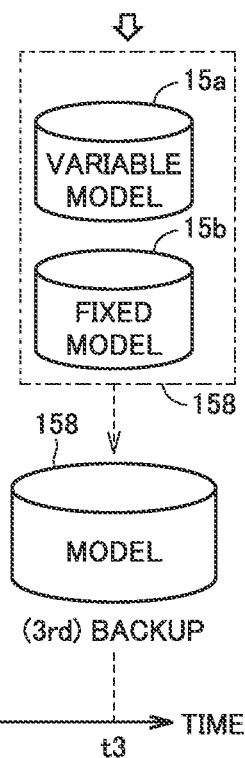

FIG.23

| No. | 1652: CHANGE TIME | 1653: CHANGE OBJECT GROUP (ENTIRE SYSTEM) | 1654: CHANGE OBJECT (WHICH PLC?) | 1655: OPERATION TERMINAL (FROM WHERE?) | 1656: WORKER (WHO?) | 1657: WHETHER TO EXECUTE BACKUP | 1658: REASON |
|---|---|---|---|---|---|---|---|
| 1 | 2019/12/12 12:05:12 | XXX LINE PLC A&PLC B | PLC B | HMI B | MR. B | "NOT EXECUTE" | |
| 2 | 2019/12/12 12:05:55 | XXX LINE PLC A&PLC B | PLC B | HMI B | MR. B | "NOT EXECUTE" | |
| 3 | 2019/12/12 12:07:12 | XXX LINE PLC A&PLC B | PLC A | HMI A | MR. Z | "EXECUTE" | CHANGE OF PRODUCTION AMOUNT XX to YY |

FIG.25

| STATE OF LINE | NOTIFICATION CONTENT | REASON |
|---|---|---|
| STATIC (DURING STOP) | AUTOMATIC BACKUP | BACKUP ASSOCIATED WITH USER PROGRAM CHANGE DETECTION |
| STATIC (DURING STOP) | AUTOMATIC BACKUP | BACKUP ASSOCIATED WITH CONNECTION DEVICE CHANGE DETECTION |
| STATIC (DURING STOP) · DYNAMIC (IN OPERATION) | AUTOMATIC BACKUP | BACKUP ASSOCIATED WITH UPDATE OF AI INFERENCE MODEL |
| STATIC (DURING STOP) · DYNAMIC (IN OPERATION) | AUTOMATIC BACKUP | BACKUP ASSOCIATED WITH CONNECTION DEVICE PARAMETER VALUE CHANGE |
| STATIC (DURING STOP) · DYNAMIC (IN OPERATION) | AUTOMATIC BACKUP | BACKUP ASSOCIATED WITH CONNECTION DEVICE THRESHOLD CHANGE |
| STATIC (DURING STOP) · DYNAMIC (IN OPERATION) | AUTOMATIC BACKUP | BACKUP ASSOCIATED WITH CONNECTION DEVICE STATE CHANGE |
| STATIC (DURING STOP) · DYNAMIC (IN OPERATION) | AUTOMATIC BACKUP | BACKUP ASSOCIATED WITH VARIABLE CHANGE BY ON-LINE EDIT |
| DYNAMIC (IN OPERATION) | OPERATION COMPETITION NOTIFICATION | CURRENT OPERATION COMPETES WITH CHANGE ON MACHINE SIDE (LARGE INFLUENCE ON QUALITY), AND OPERATION INTERRUPTION IS RECOMMENDED |
| DYNAMIC (IN OPERATION) | OPERATION COMPETITION NOTIFICATION | ALTHOUGH CURRENT OPERATION COMPETES WITH CHANGE ON MACHINE SIDE (SMALL INFLUENCE ON QUALITY), OPERATION CAN BE CONTINUED |
| STATIC (DURING STOP) · DYNAMIC (IN OPERATION) | RESTORATION RECOMMENDATION | THERE IS SETTING IN WHICH QUALITY OF FINISHED PRODUCT IS BETTER THAN THAT OF CURRENT SETTING (RESTORATION CANDIDATE: DATA W) |
| STATIC (DURING STOP) · DYNAMIC (IN OPERATION) | RESTORATION RECOMMENDATION | THERE IS SETTING IN WHICH BALANCE BETWEEN PROCESSES IS BETTER THAN THAT OF CURRENT SETTING (RESTORATION CANDIDATE: DATA E) |

FIG.26

| ERROR NOTIFICATION CONTENT | REASON |
|---|---|
| BACKUP CANCELLATION | AUTOMATIC BACKUP IS CANCELED BY USER JUDGMENT |
| BACKUP CANNOT BE PERFORMED | BACKUP CANNOT BE PERFORMED BECAUSE OF INSUFFICIENT BACKUP MEMORY |
| BACKUP CANNOT BE PERFORMED | BACKUP CANNOT BE PERFORMED BECAUSE OF INSUFFICIENT IDLE TIME IN WHICH BACKUP IN OPERATION IS PERFORMED |
| BACKUP CANNOT BE PERFORMED | BACKUP CANNOT BE PERFORMED BECAUSE OF INSUFFICIENT IDLE TIME IN WHICH BACKUP TO UPPER SYSTEM IS PERFORMED |
| BACKUP FAILURE | PERFORM BACKUP AGAIN BECAUSE BACKUP OF ENTIRE SYSTEM CONFIGURATION IS TIME OUT |
| BACKUP FAILURE | PERFORM BACKUP AGAIN BECAUSE BACKUP OF ENTIRE SYSTEM CONFIGURATION FAILED |
| BACKUP FAILURE | PERFORM BACKUP AGAIN BECAUSE BACKUP TO UPPER SYSTEM IS TIME OUT |
| BACKUP FAILURE | PERFORM BACKUP AGAIN BECAUSE BACKUP TO UPPER SYSTEM FAILED |
| DIFFERENTIAL BASE UPDATE | UPDATE BACKUP DATA OF BASE BECAUSE CHANGES FROM BACKUP DATA OF BASE ARE FIVE TIMES |
| DIFFERENTIAL BASE UPDATE | UPDATE BACKUP DATA OF BASE BECAUSE CHANGE IS GREATER THAN OR EQUAL TO PREDETERMINED RATIO FROM BACKUP DATA OF BASE |
| DIFFERENTIAL BASE UPDATE FAILURE | PERFORM BASE UPDATE AGAIN BECAUSE BASE UPDATE IS TIME OUT |
| DIFFERENTIAL BASE UPDATE FAILURE | PERFORM BASE UPDATE AGAIN BECAUSE BASE UPDATE FAILED |
| RESTORATION CANNOT BE PERFORMED | MACHINE CONFIGURATION IS DIFFERENT FROM BACKUP DATA (SYSTEM CONFIGURATION INFORMATION DIFFERENCE: INSPECTION MACHINE O) |
| RESTORATION CANNOT BE PERFORMED | DEVICE STOP CANNOT BE PERFORMED BECAUSE OF PRODUCT IN PRODUCTION |
| RESTORATION CANNOT BE PERFORMED | PERFORM RESTORATION AGAIN BECAUSE RESTORATION OF ENTIRE SYSTEM CONFIGURATION IS TIME OUT |
| RESTORATION CANNOT BE PERFORMED | PERFORM RESTORATION AGAIN BECAUSE RESTORATION OF ENTIRE SYSTEM CONFIGURATION FAILED |

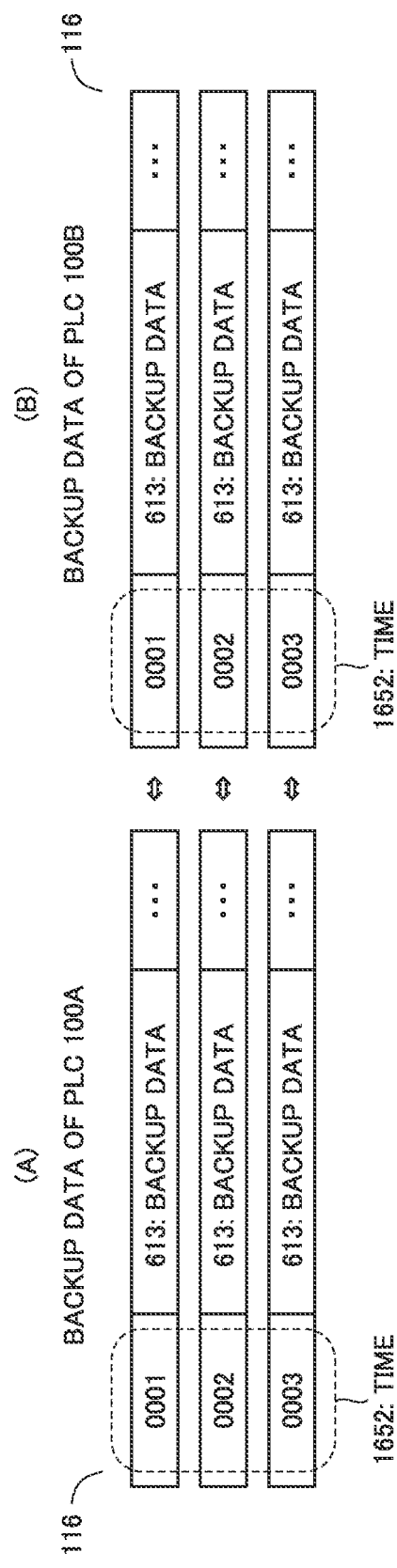

CONTROL DEVICE AND NON-TRANSITORY MACHINE READABLE STORAGE MEDIUM

CROSS REFERENCE TO RELATED APPLICATIONS

This application is a National Stage of International Application No. PCT/JP2021/028435, filed Jul. 30, 2021, claiming priority to Japanese Patent Application No. 2020-133505, filed Aug. 6, 2020, the contents of each of which being herein incorporated by reference in their entireties.

TECHNICAL FIELD

The present disclosure relates to a control device and a program, and more particularly, to a control device and a program that provide an environment in which information can be backed up.

BACKGROUND ART

Regarding the backup of the information on industrial machines, for example, in an industrial system of PTL 1 (WO 2017/115426 A), a programmable controller is connected to a data management device through a network. When receiving a signal requesting project data including a control program from the data management device, a CPU of the programmable controller reads the project data from the storage and transmits the project data to a data backup unit of the data management device (See FIG. 1 and paragraphs 0041, 0068).

In a programmable logic controller (PLC) system disclosed in PTL 2 (WO 2014/174546 A), when the CPU of the PLC receives notification that the device changes device setting information held in an internal memory, reads the device setting information held in the internal memory of a backup object device, and overwrites and saves the device setting information stored in the external storage medium of the PLC, namely, performs backup (see paragraph 0019).

CITATION LIST

Patent Literature

PTL 1: WO 2017/115426 A
PTL 2: WO 2014/174546 A

SUMMARY OF INVENTION

Technical Problem

PTL 1 requires a data management device provided separately from the programmable controller in order to back up the control program stored in the programmable controller. On the other hand, in PTL 2, the PLC backs up the device setting information stored in the internal memory of the device without using another device such as a data management device. However, because the PLC of PTL 2 needs to receive a notification that the device setting information is changed from an external device, the PLC needs to have a mechanism receiving the notification.

An object of the present disclosure is to provide a control device and a program capable of implementing backup of information with a simple configuration.

Solution to Problem

In the present disclosure, a control device that controls an object, the control device includes: a storage configured to store information controlling the object; and a change detector configured to detect that information in the storage is changed, in which the control device executes backup processing of the information stored in the storage when the change detector detects that the information in the storage is changed during operation.

According to the above disclosure, when the information in the storage included in the control device has been changed during the operation, the control device can implement the backup of the information with a simple configuration in which the backup processing of the information in the storage is executed.

In the above disclosure, the change detector detects that the information is changed based on a user operation for the information stored in the storage.

According to the above disclosure, the control device can detect the change in the information by detecting the user operation on the information in the storage.

In the above disclosure, the change detector detects that the information is changed based on a calculation value calculated from the information stored in the storage.

According to the above disclosure, the control device can detect the change of the information based on the value calculated from the information in the storage.

In the above disclosure, the information stored in the storage includes at least one of a control program controlling the object, setting data for the controlling, and machine learning data related to the controlling.

According to the above disclosure, when the change in information of the storage is detected, the control device can back up at least one of the control program controlling the object, the setting data for the control, and the machine learning data related to the control.

In the above disclosure, the control device is communicably connected to a network configuration including the object, and the information stored in the storage includes network configuration data including the control device connected to the network configuration and an identifier of a device including the object.

According to the above disclosure, when the change in the information of the storage is detected, the control device can back up the network configuration data including the control device connected to the network configuration and the identifier of the device including the object. Thus, for example, each time the control device and the object device connected to the network are changed, namely, the network configuration data including the control device and the identifier of the object device is changed, the network configuration data can be backed up.

In the above disclosure, the backup processing includes processing for copying information in the storage and storing the copied information in a storage medium, and the storage medium includes a storage medium included in an upper system connected to the control device through a network.

According to the above disclosure, the backed-up information can be stored in the storage medium of the upper system.

In the above disclosure, a plurality of the control devices are communicably connected to a network configuration including the object, and each of the control devices transmits a request causing another control device to execute the backup processing through the network configuration when detecting that the information stored in the storage of the own control device is changed.

According to the above disclosure, when the change in information is detected by one control device connected to the network configuration, the plurality of control devices connected to the network configuration can be caused to perform the backup processing.

In the above disclosure, the plurality of control devices perform time synchronization, and each of the plurality of control devices back up the information in association with a time based on the synchronized time in the backup processing.

According to the above disclosure, the information backed up by each control device can be managed in association with the time based on the time synchronized between the control devices.

In the above disclosure, the plurality of control devices perform the time synchronization, and when the change detector of one control device of the plurality of control devices detects that the information in the storage of the own device is changed during operation, each of the plurality of control devices executes backup processing of the information stored in the storage of the own device at a specified time based on the synchronized time.

According to the above disclosure, the specified time based on the synchronized time is set as the time at which the backup processing of the information stored in the storage unit is executed, and the plurality of control devices can simultaneously perform the backup processing at the specified time.

In the above disclosure, the one control device transmits a notification of the specified time to the other control devices when the change detector detects that the information in the storage of the one device is changed.

According to the above disclosure, the other control device can acquire the notification of the specified time at which the backup processing is simultaneously performed from one control device.

In the above disclosure, the control device further includes: a processor; and a scheduler configured to manage a plurality of programs executed by the processor according to a priority within a predetermined cycle, in which the plurality of programs managed by the scheduler include: a first program for first processing including the control processing, the first program having a high priority executed by the processor in the cycle; and a second program for second processing having a lower priority of the execution than the first program, the second program being executed in an idle time of the processor in the cycle, the first program includes a control program controlling the object, the second program includes a backup program performing the backup processing, and the scheduler causes the processor to execute the backup program in the idle time of each of at least one cycle in which a total length of the idle time of each cycle corresponds to a required time of the backup processing.

According to the above disclosure, when the control device that cyclically executes the control program is in operation, the scheduler causes the processor to execute the backup program in each idle time of at least one cycle in which the total length of the idle time in each cycle corresponds to the required time of the backup processing. Accordingly, an environment in which the information can be backed up can be provided while guaranteeing the execution of the control program within a predetermined cycle during operation.

In the above disclosure, the control device further determines the at least one cycle in which the total length of the idle time of each cycle corresponds to the required time of the backup processing.

According to the above disclosure, the number of cycles corresponding to the required time of the backup processing can be determined from the total length of the idle time of each cycle.

In the above disclosure, the control device further sets an information amount of a backup object in the idle time in each cycle to the backup program based on the required time of the backup processing and the idle time.

According to the above disclosure, the information amount to be backed up in the idle time within each cycle, which should be set in the backup program, can be set based on the time required for the backup processing and the idle time.

In the above disclosure, the backup processing includes a differential backup that holds copying information obtained by copying the information in the storage, thereafter, derives difference information between the copying information and post-change information every time the information in the storage is changed, and integrates at least one piece of derived difference information and the copying information.

According to the above disclosure, by acquiring the difference information every time the information in the storage is changed, the backup is not required every time the information is changed, and an increase in load applied to the control device can be prevented.

In the above disclosure, the differential backup integrates the at least one piece of difference information and the copying information when a number of subsequent changes exceeds a threshold.

According to the above disclosure, whether to execute the differential backup can be determined based on the number of changes so far. Thus, when the differential backup is performed using the acquired differential information, the differential information can be acquired within a range in which the load applied to the backup or the integration processing can be prevented.

In the above disclosure, the differential backup integrates the at least one piece of difference information and the copying information when a ratio of an information amount of the at least one piece of difference information to an information amount of the copying information exceeds a threshold.

According to the above disclosure, whether to execute the differential backup can be determined based on the ratio of the information amount of the differential information acquired by the change so far to the copying information that is the original information. Thus, when the differential backup is performed using the acquired differential information, the differential information can be acquired within a range in which the load applied to the backup or the integration processing can be prevented.

In the above disclosure, the control device further includes: a display for displaying a user interface (UI) indicating an identifier of the at least one piece of backed-up information; and an interface for receiving a user operation designating information about a restoration object from the at least one piece of backed-up information.

According to the above disclosure, the control device can provide a tool selecting information to be restored from among the at least one piece of backed-up information through the UI to the user.

In the above disclosure, the identifier of the at least one piece of backed-up information is associated with a time at which the information is backed up.

According to the above disclosure, the time at which the information is backed up can be used in order to identify the backed-up information.

In the above disclosure, the storage has a volatile storage area that stores the information.

According to the above disclosure, the information stored in the volatile storage area of the control device can be set as the backup target.

In the present disclosure, a non-transitory machine readable storage medium containing a program executed by a processor included in a control device controlling an object is provided. The control device includes a storage storing information controlling the object, in which when the program is executed, the program causes the processor to: detect that the information in the storage is changed; and execute backup processing of the information stored in the storage in response to the detection that the information is changed when the control device is in operation.

According to the above disclosure, when the information in the storage included in the control device is changed during the operation by the execution of the program, the backup of the information can be implemented with a simple configuration in which the backup processing of the information in the storage is executed.

Advantageous Effects of Invention

According to the present disclosure, the environment in which the information can be backed up with the simple configuration can be provided.

BRIEF DESCRIPTION OF DRAWINGS

FIG. 20 is a view schematically illustrating the backup of the machine learning data according to the embodiment.

FIG. 23 is a view illustrating an example of a selection screen of "restoration object data" according to the embodiment.

FIG. 24(A) illustrates a menu screen, FIGS. 24(B), 24(C) and 24(D) illustrate screens for receiving user operations, and FIGS. 24(E) and 24(F) illustrate screens of "setting adjustment".

FIG. 25 is a view illustrating an example of a notification content to a user according to the embodiment.

FIG. 26 is a view illustrating an example of the notification content to the user according to the embodiment.

FIG. 28 is a view illustrating a case where backup data synchronized in time is acquired between PLCs 100 according to the embodiment, wherein FIG. 28 (A) illustrates backup data of PLC 100A and FIG. 28 (B) illustrates backup data of PLC 100B.

DESCRIPTION OF EMBODIMENT

Figure 1:
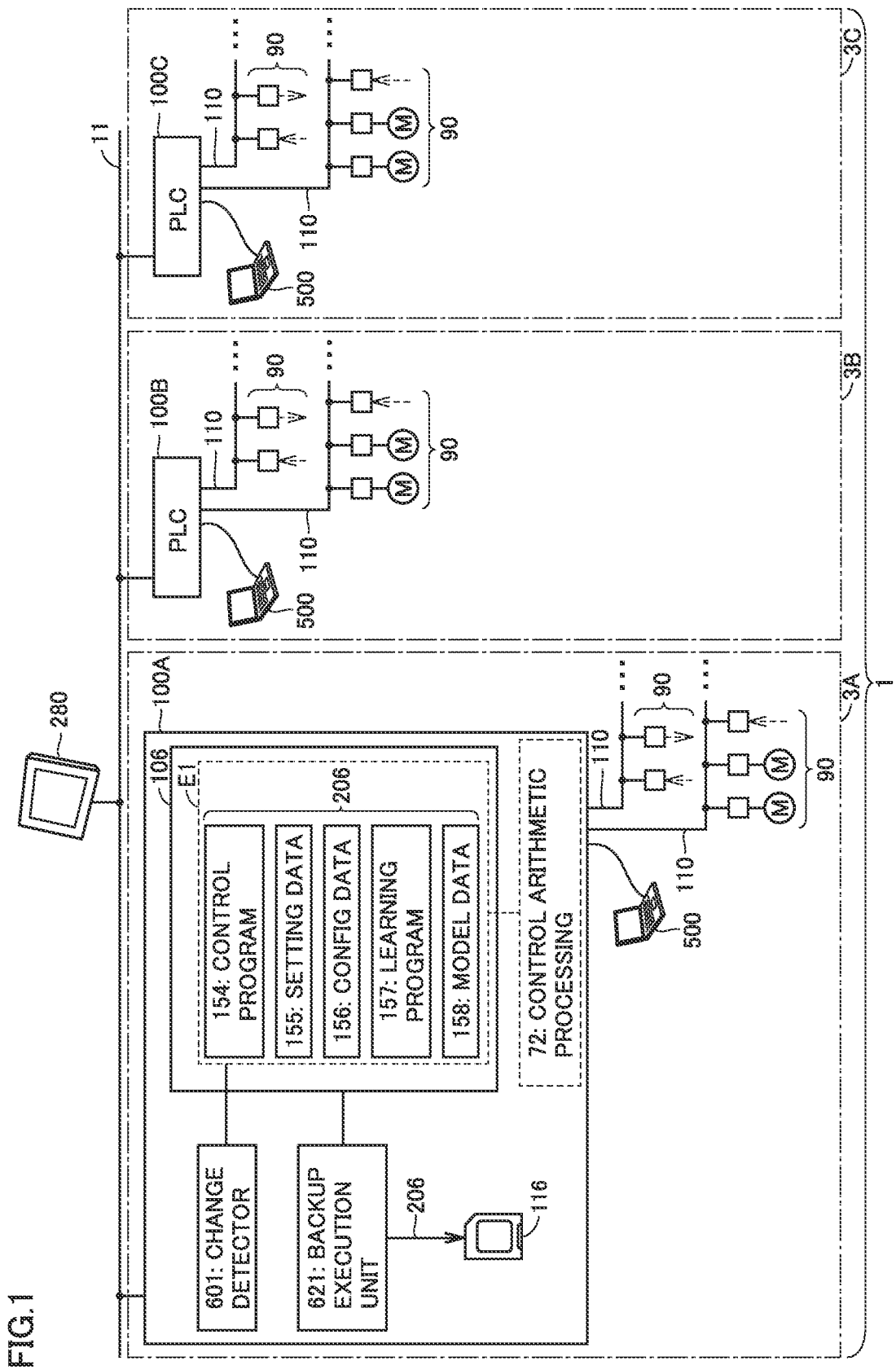
FIG. 1 is a view schematically illustrating a configuration of a control system including a PLC that implements backup of information according to an embodiment.

With reference to the drawings, an embodiment will be described below. In the following description, the same components and constituents are denoted by the same reference numerals. Those names and functions are the same. Accordingly, the detailed description thereof will not be repeated.

A. Application Example

An example of a scene to which the present invention is applied will be described. FIG. 1 is a view schematically illustrating a configuration of a control system 1 including a programmable logic controller (PLC) that implements backup of information according to the embodiment. In FIG. 1, control system 1 applicable to factory automation (FA) has a network configuration in which PLCs 100A, 100B, and 100C and a plurality of field devices 90 that are control objects are communicably connected to a network. More specifically, PLCs 100A, 100B, and 100C are connected to a network 11 that is a control level network. Furthermore, a human machine interface (HMI) 280 configured to manage a device and a production line that are connected to network 11 is communicably connected to network 11. A data link capable of exchanging data between devices is formed in network 11. PLCs 100A, 100B, and 100C communicably connect one or a plurality of field devices 90 such as sensors and actuators through a network 110. Hereinafter, in the description of the embodiment common to PLCs 100A, 100B, and 100C, sometimes PLCs 100A, 100B, and 100C are collectively referred to as a PLC 100.

In addition to being connected to PLC 100 through network 110, sometimes field device 90 is directly connected to PLC 100 through an input/output unit (not illustrated) related to PLC 100. Each of field devices 90 includes an actuator that gives some physical action to a manufacturing device, a production line, or the like (hereinafter, also collectively referred to as a "field"), an input/output device that exchanges information with the field, and the like.

The data exchanged between PLC 100 and field device 90 through network 110 is updated in a very short cycle of several 100 usec order to several 10 msec order. The exchanged data update processing is implemented by an IO refresh 71.

A support device 500 can be connected to PLC 100. Support device 500 provides a support tool that supports a user to operate control system 1. The support tool includes a preparation setting tool such as an execution environment of a control program or a communication environment with PLC 100. For example, the support tool is provided to the user by a user interface (UI).

By providing a supervisory control and data acquisition (SCADA) function, HMI 280 graphically displays data monitoring or controlling a system processed by the SCADA and receives a user operation. In control system 1, PLC 100, support device 500, and HMI 280 are configured as separate bodies, but a configuration in which all or a part of these functions is integrated into a single device may be adopted. Support device 500 may be connected to network 11, built in PLC 100, or provided as a portable terminal.

PLCs 100A, 100B, and 100C connected to network 11 of control system 1 are provided in different processes 3A, 3B, and 3C, respectively. For example, but not by way of limitation, process 3A illustrates an assembly process of a product (workpiece), process 3B illustrates a painting process of the assembled product, and process 3C illustrates an inspection process of the painted product.

In the embodiment, the PLC will be described as a specific example as a typical example of the "control device", but the technical idea disclosed in the present specification is not limited to the name of the PLC, and can be applied to any control device.

In FIG. 1, the configuration in which the information about the storage included in PLC 100 is backed up will be described as a representative of PLC 100A, but the same configuration can be applied to other PLCs 100B and 100C, and the description will not be repeated. PLC 100A includes a backup execution unit 621 and a change detector 601 in order to back up information stored in a main storage device 106 of the own device. More specifically, the information stored in main storage device 106 includes information controlling field device 90 of the control object. Change detector 601 detects that the information stored in main storage device 106 is changed. When change detector 601 detects that the information about main storage device 106 is changed while PLC 100A is in-operation time, backup execution unit 621 executes processing for backing up the information stored in main storage device 106 with change detection as a trigger.

In the embodiment, "in-operation time" of PLC 100 includes a state in which PLC 100 can control the object by cyclically executing a program controlling field device 90 according to a control cycle 70 described later. Accordingly, non-operation time of PLC 100 includes a state in which PLC 100 does not execute the program, more specifically, a state in which the cyclic control according to control cycle 70 is stopped.

In the embodiment, the object information to be backed up is also referred to as "object information". Main storage device 106 stores object information 206. Object information 206 includes information controlling the object (field device 90). More specifically, object information 206 includes, for example, a control program 154 controlling field device 90, setting data 155 for the control, config data (abbreviation of connection data) 156, and machine learning data related to the control. For example, control program 154 includes at least one user program (UPG) that can have a script of an interpreter. More specifically, a code of control program 154 of main storage device 106 can include executable binary code such as a source code or an intermediate code executable by an interpreter system, or a native code. Setting data 155 is the data for the control, and for example, includes a threshold of a sensor of field device 90. Config data 156 corresponds to network configuration data including an identifier of each device including PLC 100 and field device 90 that are connected to the network configuration in FIG. 1. More specifically, information identifying field device 90 connected to PLC 100 (number, model, and the like) and information identifying PLC 100 connected to network 11 (number, model, and the like) are included.

For example, the machine learning data includes a learning program 157 and model data 158 that implement the machine learning processing. Object information 206 may include at least one of control program 154 controlling field device 90, setting data 155 for the control, config data 156, and the machine learning data related to the control.

Change detector 601 detects that object information 206 is changed based on the user operation on object information 206 stored in main storage device 106, or detects that object information 206 is changed based on a calculated value calculated from object information 206.

More specifically, change detector 601 detects a change in object information 206 based on the user operation on object information 206. For example, the user operation changing object information 206 may include the user operation received by support device 500, HMI 280, or PLC 100A. When receiving the user operation changing object information 206, support device 500 or HMI 280 transmits the received user operation content to PLC 100A. PLC 100A changes (addition, deletion, rewriting, and the like) object information 206 in main storage device 106 based on the user operation content. Such the user operation includes an online edit operation. The online edit operation includes an editing operation in which the user changes (adjusts) a setting value such as a threshold of setting data 155 in main storage device 106, changes config data 156 with a change of field device 90, or changes (including addition and deletion) an instruction code of the UPG while operating PLC 100A. The operation object data is not limited thereto. In addition, for example, change detector 601 may cyclically calculate a value using a predetermined function from the binary code of a storage area E1 of main storage device 106 in which object information 206 is stored, compare the calculated value with the previously calculated value each time the value is calculated, and detect whether object information 206 is changed based on a comparison result. For example, the value calculated by the predetermined function includes a hash value or a checksum value.

The backup processing performed by backup execution unit 621 includes processing for copying information in storage area E1 of main storage device 106 and storing (writing) the copied information in a predetermined storage area different from storage area E1. The storage medium constituting the storage area of the storage destination of the copied information is also referred to as a "backup destination medium". The "backup destination medium" includes a non-volatile storage medium having a non-volatile storage area. For example, the non-volatile storage medium includes a memory card 116 that can be detachably connected to PLC 100A.

Backup execution unit 621 executes the backup processing not when PLC 100A is stopped but when PLC 100A is in operation. Accordingly, PLC 100A can back up object information 206 when the change in object information 206 is detected during the operation of PLC 100A such as during the operation of the production line.

In FIG. 1, memory card 116 is used as the "backup destination medium", but the "backup destination medium" is not limited to memory card 116 as long as it is the nonvolatile storage medium capable of storing object information 206. In the present disclosure, the "backup destination medium" is not limited to the medium included in PLC 100A as long as it is the nonvolatile storage medium, and for example, includes the storage medium included in support device 500 or HMI 280, or the storage medium included in an upper system 300 described later. When upper system 300 includes a computing device on the cloud, the "backup destination medium" can include the storage medium provided by a cloud environment.

Main storage device 106 is mainly configured of a volatile storage device such as a dynamic random access memory (DRAM) or a static random access memory (SRAM). The "backup destination medium" includes memory card 116, a read only memory (ROM), a flash memory, a magnetic storage device (hard disk drive, flexible disk, magnetic tape, and the like), an optical disc, and the like.

In the embodiment, the storage in which object information 206 of the detection object by change detector 601 is stored is main storage device 106 that is an example of the volatile storage medium, but the storage is not limited to main storage device 106. In addition, the storage in which object information 206 of the detection object by change detector 601 is stored is not limited to the volatile storage medium, but may be configured to include the nonvolatile storage medium.

PLC 100A performs restoration in order to transfer (store) object information 206 backed up in memory card 116 from the "backup destination medium" to, for example, main storage device 106 that is the original storage medium. In this case, the backed-up information may be stored in the original storage medium after being subjected to predetermined processing. The predetermined processing includes decompression (decompression) of compressed information, a virus check, and the like. More specific application examples of the embodiment will be described below.

B. Hardware Configuration Example

Figure 2:
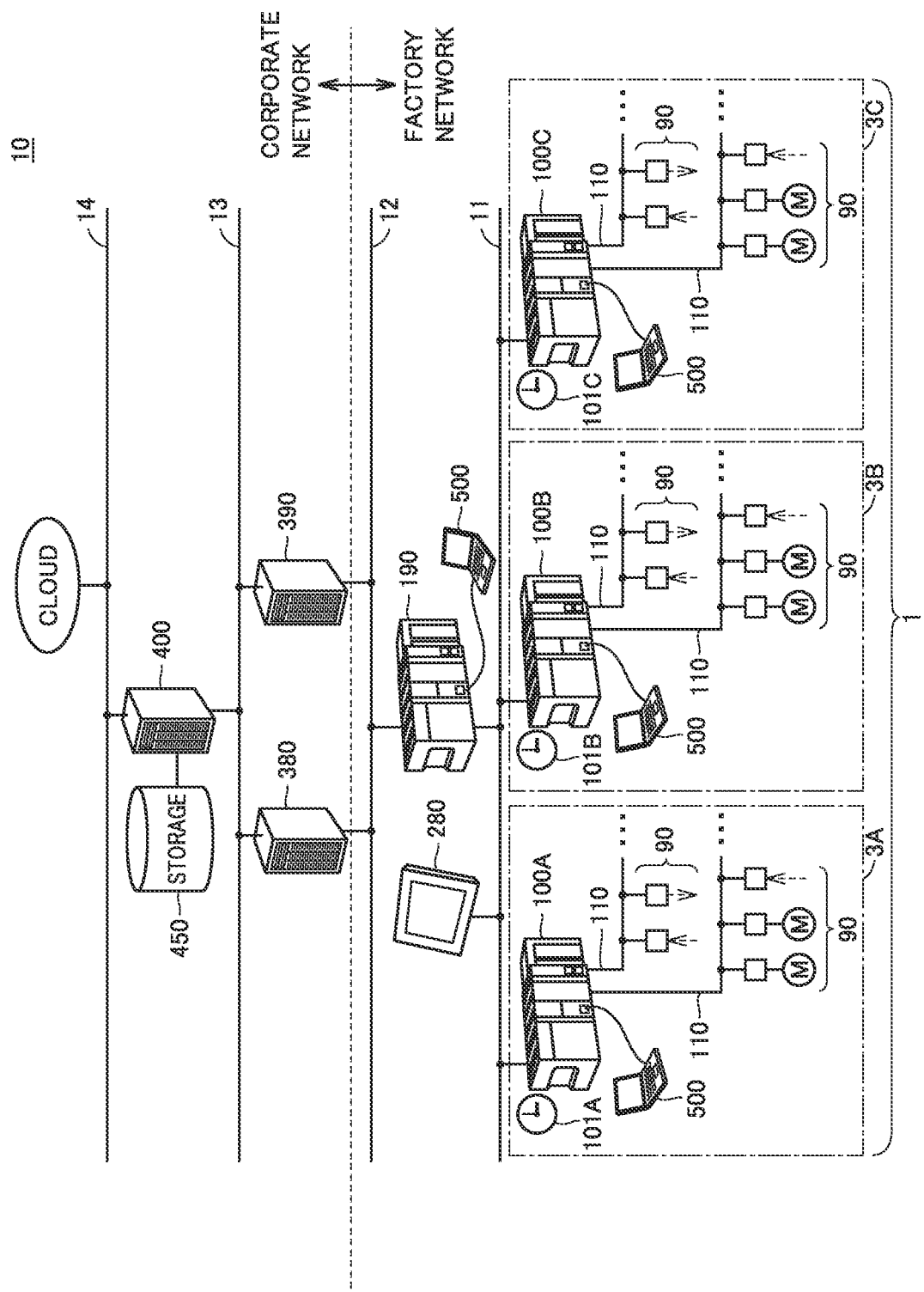
FIG. 2 is a schematic diagram illustrating an example of an overall configuration of a communication system according to the embodiment.

An example of a network system 10 including control system 1 applicable to FA of the embodiment will be described. FIG. 2 is a schematic diagram illustrating an example of an overall configuration of network system 10 of the embodiment.

FIG. 2 illustrates a specific configuration including control system 1 in FIG. 1 and a peripheral portion of control system 1. With reference to FIG. 2, in network system 10, networks are connected at multiple levels, and for example, but not limited to, four levels of networks 11, 12, 13, and 14 are provided.

Network 11 is a control level network. Network 11 is connected to a device and line management device 190 in addition to the plurality of PLCs 100A, 100B, and 100C and HMI 280 in FIG. 1. Device and line management device 190 and HMI 280 correspond to a device connected to the network and a device that manages the production line. Network 11 provides the transmission of the information about the control system as a main function. In FIG. 2, the number of PLCs 100 connected to network 11 is three, but the number is not limited.

Network 12 is connected to device and line management device 190 that manages the device and the line, and manufacturing management devices 380 and 390 that manage a manufacturing plan and the like. Device and line management device 190 and manufacturing management devices 380 and 390 exchange management information such as a manufacturing plan and exchange information about the device or the line through network 12.

Network 13 is provided as a computer level network. Manufacturing management devices 380 and 390 and a manufacturing execution system (EMS) 400 that manages data using a storage 450 are connected to network 13. Manufacturing management devices 380 and 390 and manufacturing execution system 400 exchange data of production management and an information system through network 13. Storage 450 includes an area storing data of a time series DB (abbreviation of database).

Manufacturing execution system 400 stores the observation value, which is the input value from field device 90 collected through network 13, in the time series DB as time series data according to the observed order.

Network 14 includes an external network such as the Internet. Manufacturing execution system 400 and the external device on the cloud are connected to network 14. Manufacturing execution system 400 transfers the data of the time series DB to the cloud computing device by exchanging the data with the device on the cloud.

Host system 300 described later includes device and line management device 190 in FIG. 1, manufacturing management devices 380 and 390, manufacturing execution system 400, and the computing device provided in the cloud environment. In network system 10 of FIG. 2, network 12 and network 11 and network 110 at a level lower than network 12 are also referred to as a "factory network", and provide control system communication exchanging the data actually controlling devices. Meanwhile, network 13 and network 14 at a higher level than network 13 are also referred to as a "corporate network", and provide information system communication exchanging the data monitoring, managing, and controlling production activities and the like in a production line and factory.

EtherNet/IP (registered trademark), which is an industrial open network in which a control protocol is mounted on general-purpose Ethernet (registered trademark), may be used as the protocols of networks 11 and 12 belonging to the factory network. EtherCAT (registered trademark), which is an example of a machine control network, may be adopted as the protocol of network 110. The protocol (first protocol) of network 11 and the protocol (second protocol) of network 110 may be the same or different. A real-time property in which the time required for the transmission between devices is guaranteed can be provided by adopting a network technology suitable for such machine control.

As the protocols of networks 13 and 14, the general-purpose Ethernet or the like is used in order to ensure diversity of connection destinations. A restriction on a transmittable data amount and the like can be eliminated by adopting the general-purpose Ethernet.

C. Time Synchronization in Control System 1

In network system 10 of FIG. 2, PLC 100 included in control system 1 executes processing (input processing) for collecting data (input data) collected or generated in field device 90, processing (control arithmetic processing) for generating data (output data) such as a command to field device 90, processing (output processing) for transmitting the generated output data to object field device 90, and the like. Such input processing and output processing correspond to IO refresh 71.

In network 110, because a data arrival time needs to be guaranteed, each PLC 100 and field device 90 connected to PLC 100 have timers time-synchronized with each other.

PLCs 100A, 100B, and 100C also have timers 101A, 101B, and 101C time-synchronized with each other, respectively. Thus, control system 1 implements cooperative control of the plurality of field devices 90 connected to PLCs 100 different from each other, namely, cooperative control based on a synchronized time of the plurality of field devices 90 between different processes. Hereinafter, in the description common to timers 101A, 101B, and 101C, the timers are collectively referred to as timers 101.

In control system 1 of the embodiment, the transmission and reception timings are synchronized among the plurality of PLCs 100 and at least one field device 90 connected to network 110. Specifically, each of PLC 100 and at least one field device 90 includes a timer synchronized in time with each other, and determines the timing of data transmission or reception according to the timer.

In the embodiment, "timing" represents a concept such as a certain moment indicating a cycle, time, or a width of time shorter than time when some event is generated. In addition, "time synchronization" indicates that timers, time data, and the like included in each other are synchronized.

D. Configuration of PLC 100

Figure 3:
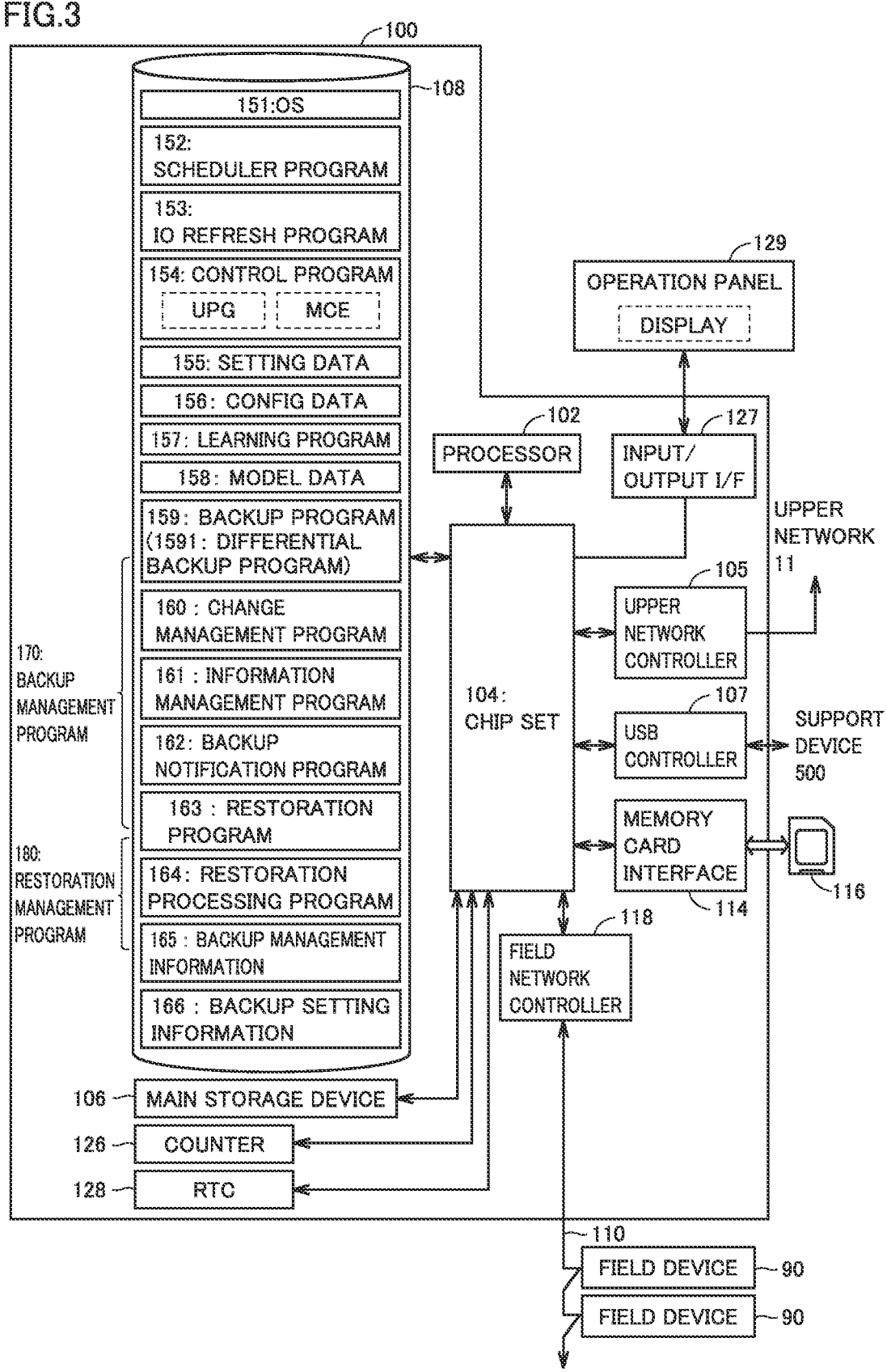
FIG. 3 is a block diagram illustrating a hardware configuration example of the PLC according to the embodiment.

FIG. 3 is a block diagram illustrating a hardware configuration example of PLC 100 of the embodiment.

PLC 100 includes a processor 102, a chip set 104, main storage device 106, a secondary storage device 108, an upper network controller 105, a universal serial bus (USB) controller 107, a memory card interface 114, a field network controller 118, a counter 126, and a real time clock (RTC) 128, and input/output interface (I/F) 127 to which an operation panel 129 is connected. Operation panel 129 is provided as a touch panel including a display that displays information. The user can input information such as an instruction to PLC 100 through operation panel 129.

Processor 102 is configured of a central processing unit (CPU), a microprocessor unit (MPU), a graphics processing unit (GPU), and the like, reads various programs stored secondary storage device 108, expands various programs in main storage device 106, thereby implementing the control corresponding to the control object and various pieces of processing described later. Secondary storage device 108 is configured of the nonvolatile storage device such as a hard disk drive (HDD) or a solid state drive (SSD).

Chip set 104 implements the processing of PLC 100 as a whole by controlling processor 102 and each device.

In addition to the system program implementing basic functions including an operating system (OS) 151, secondary storage device 108 stores a scheduler program 152 implementing a scheduler 640 described later, an IO refresh program 153 implementing IO refresh 71, a control program 154 including the UPG and a motion control engine (MCE) produced according to a manufacturing device or equipment of the control object, setting data 155, config data 156, a learning program 157, and model data 158. Furthermore, secondary storage device 108 stores various programs and data as described later.

Host network controller 105 exchanges the data with HMI 280, manufacturing execution system 400, the device on the cloud (see FIG. 2), or the like through upper network 11. A USB controller 107 controls the data exchange with support device 500 through USB connection.

Memory card interface 114 is configured such that memory card 116 is detachable, and can write object information 206 in attached memory card 116 and read various data from memory card 116.

Counter 126 is used as a reference of the time at which the execution timing of various processes is managed in PLC 100. Counter 126 typically increments or decrements the counter value every predetermined cycle. RTC 128 is a kind of counter having a clocking operation, and provides the current time to processor 102 and the like. Timer 101 is configured of one or a combination of counter 126 and the RTC 128.

Field network controller 118 controls the data exchange between PLC 100 and field device 90 through field network 110. Each field device 90 on network 110 also includes a counter (not illustrated) for the time synchronization with counter 126 of PLC 100.

Control system 1 typically increments or decrements various counters such as counter 126 used for the time synchronization between devices at each predetermined cycle. A high precision event timer (HPET) or a dedicated circuit (for example, an application specific integrated circuit (ASIC) or a field-programmable gate array (FPGA)), which are a hardware timer, may be mounted as the counter.

With reference to FIG. 3, secondary storage device 108 further stores a backup management program 170 managing the execution of the backup processing, a restoration management program 180 managing the execution of the restoration processing, backup management information 165, and backup setting information 166.

Backup management program 170 includes a backup program 159, a change management program 160, an information management program 161, and a backup notification program 162. Backup program 159 includes a differential backup program 1591 performing a differential backup described later. Restoration management program 180 includes a restoration program 163 and a restoration processing program 164

Config data 156 indicates the latest network configuration information. More specifically, processor 102 extracts an identifier from the data received from network 11 or the device (PLC 100, field device 90) connected to network 110 by IO refresh 71, and manages config data 156 using the extracted identifier and the identification information indicated by config data 156. In addition, processor 102 accepts the user operation on config data 156, and changes (edits) the identification information and the like of config data 156 based on the accepted user operation. Thus, when the device connected to the network configuration is changed (addition, deletion, replacement, or the like), the latest configuration information of the network configuration can be indicated by config data 156. The method for changing config data 156 is not limited thereto.

When executed, learning program 157 implements inference processing with reference to the learning model indicated by model data 158. The inference processing is not limited, and for example, includes inference processing of abnormality detection of a monitoring object including field device 90. More specifically, in the inference processing, processor 102 calculates a feature amount based on the state value of the monitoring object from the input data collected by IO refresh 71, evaluates a degree of deviation of the feature amount from the learning model (also referred to as an inference model), and detects (inferred) existence of abnormality according to the evaluation result. Model data 158 of the learning model can be determined by a known data mining method. Examples of a technique applicable to the inference processing based on the degree of deviation include a k-nearest neighbor method, a local outlier factor (LoF) method, and an isolation forest (iForest) method. A deep binary tree (DBT) can also be used as another technique. In the inference processing, model data 158 can be appropriately updated based on a learning result or a rule base.

When executed, change management program 160 detects whether object information 206 is changed. When executed, information management program 161 manages backup management information 165 and backup setting information 166. When executed, backup notification program 162 performs processing for outputting various notifications related to the backup. When executed, restoration program 163 performs the restoration. When executed, restoration processing program 164 performs the processing related to the restoration.

Backup management information 165 includes the information managing the backup of object information 206. Backup setting information 166 includes the information set for performing the backup.

As illustrated in FIG. 3, when PLC 100 is in operation, the program in secondary storage device 108 is read and developed in main storage device 106 and executed by processor 102. When PLC 100 is in operation, the data or information in secondary storage device 108 is read to main storage device 106, or read from secondary storage device 108 to main storage device 106 as appropriate according to the executed program. More specifically, when PLC 100 is in operation, object information 206 including control program 154, setting data 155, config data 156, learning program 157, and model data 158 is read from secondary storage device 108 and stored in storage area E1 of main storage device 106.

E. Configuration of HMI 280

Figure 4:
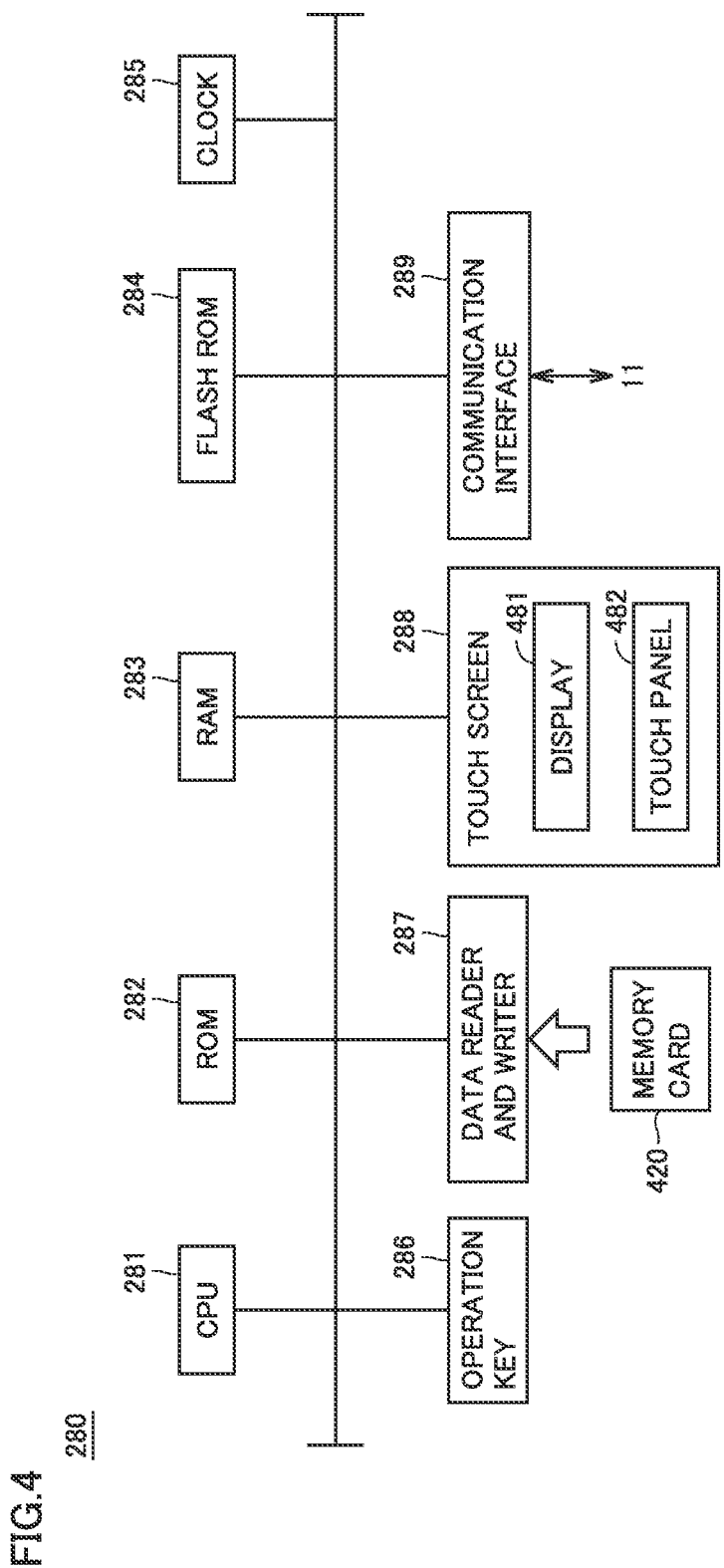
FIG. 4 is a view schematically illustrating a hardware configuration of an HMI according to the embodiment.

FIG. 4 is a view schematically illustrating a hardware configuration of HMI 280 of the embodiment. With reference to FIG. 4, HMI 280 includes a CPU 281, a read only memory (ROM) 282, a random access memory (RAM) 283, a flash ROM 284 storing various programs and data in a nonvolatile manner, a clock 285, an operation key 286 receiving the operation of the user, a data reader and writer 287, a touch screen 288, and a communication interface 289. These units are connected to each other through an internal bus.

Touch screen 288 includes a display 481 and a touch panel 482 receiving the input of the operator. A communication interface 419 controls communication between HMI 280 and PLC 100 connected to network 11. Data reader and writer 287 mediates the data transmission between CPU 281 and a memory card 420 that is an external storage medium.

F. Configuration of Support Device 500

Figure 5:
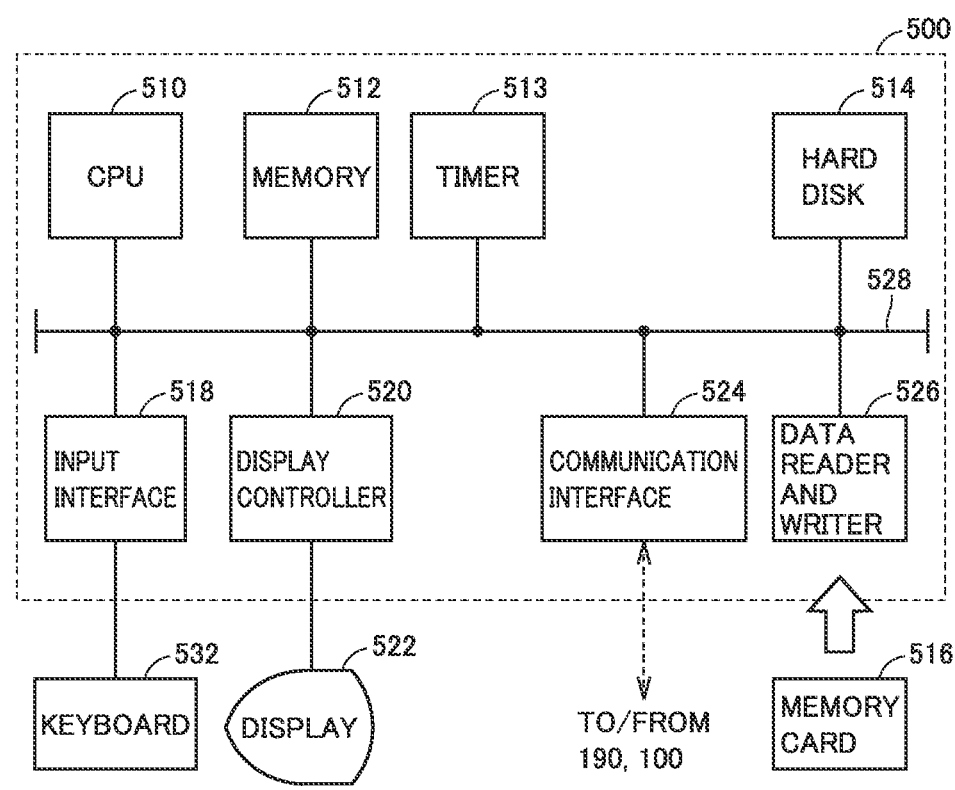
FIG. 5 is a view schematically illustrating a hardware configuration of a support device according to the embodiment.

FIG. 5 is a view schematically illustrating a hardware configuration of a support device 500 of the embodiment. With reference to FIG. 5, support device 500 includes a CPU 510, a memory 512 including a volatile storage device such as a dynamic random access memory (DRAM), a timer 513, a hard disk 514 configured of the nonvolatile storage device such as an HDD, an input interface 518, a display controller 520, a communication interface 524, and a data reader and writer 526. These units are data-communicably connected to each other through a bus 528.

Input interface 518 mediates the data transmission between CPU 510 and input devices such as a keyboard 523, a mouse (not illustrated), and a touch panel (not illustrated). Display controller 520 is connected to a display 522 and displays a processing result in CPU 510 and the like. Communication interface 524 communicates with PLC 100 or device and line management device 190 through USB. Data reader and writer 526 mediates the data transmission between CPU 510 and a memory card 516 that is an external storage medium.

Memory card 420 in FIG. 4 and memory card 516 in FIG. 5 include the volatile storage medium or the nonvolatile storage medium, and for example, include a general-purpose semiconductor storage device such as a compact flash (CF) or an SD (Secure Digital), a magnetic storage medium such as a flexible disk, or an optical storage medium such as a compact disk read only memory (CD-ROM).

G. Period Control

Figure 6:
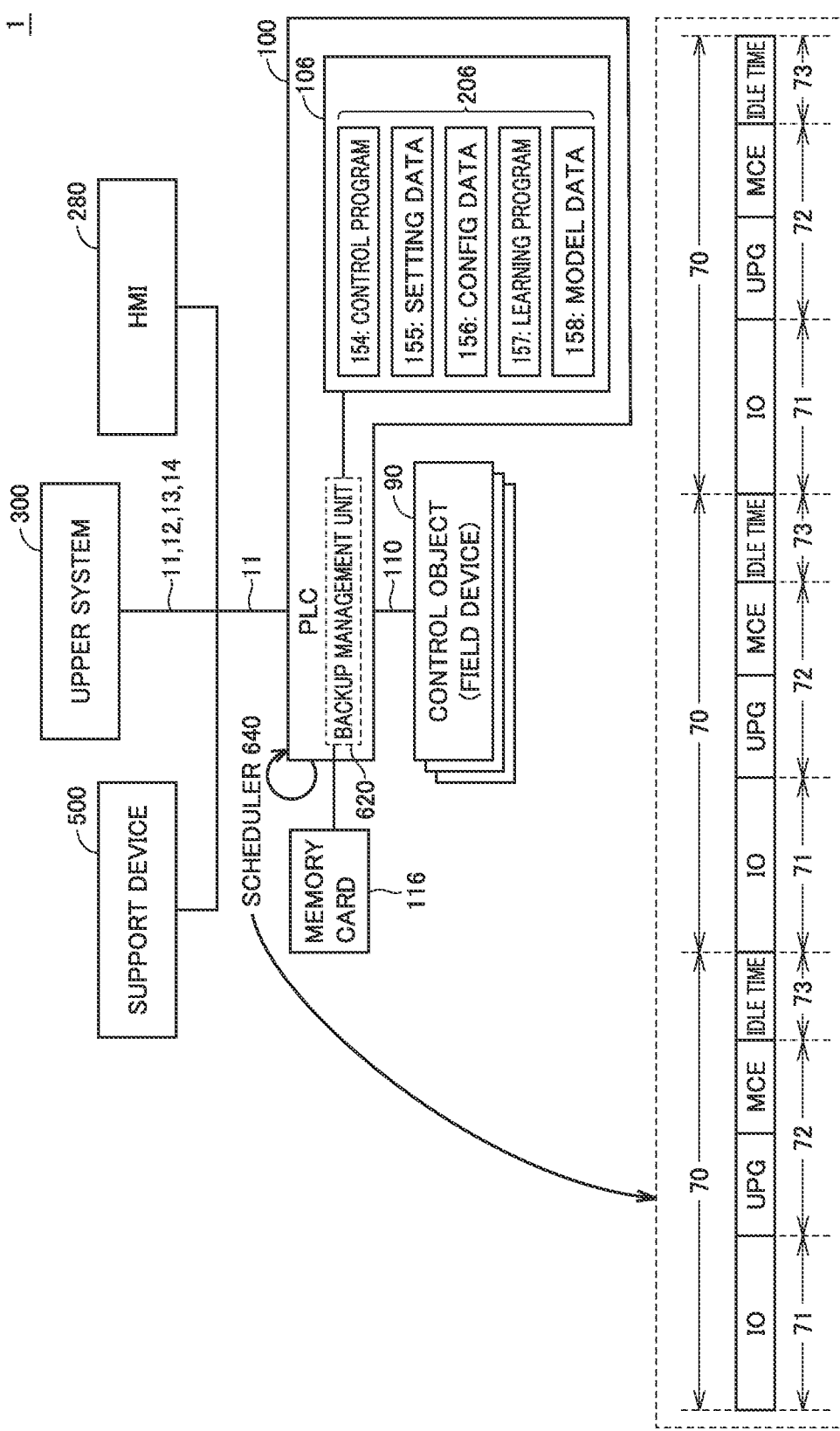
FIG. 6 is a diagram illustrating a configuration for implementing backup according to the embodiment in association with a control cycle.

In the embodiment, an environment in which the backup of object information 206 can be performed while guaranteeing the execution of control program 154 within a predetermined cycle is provided. FIG. 6 is a diagram illustrating a configuration for implementing the backup of the embodiment in association with control cycle 70. The backup processing within such the cycle is similarly performed for each PLC 100. With reference to FIG. 6, PLC 100 communicates with one or a plurality of field devices 90 through network 110, and communicates with HMI 280 and another PLC 100 (not illustrated) through network 11. PLC 100 communicates with support device 500 and also communicates with upper system 300 through networks 11 to 14. In FIG. 6, support device 500 is connected to PLC 100 through network 11, but may be connected to PLC 100 by USB controller 107 without network 11.

Host system 300 is configured to manage control system 1 by exchanging the data with PLC 100. Host system 300 includes at least one of device and line management device 190, manufacturing management devices 380 and 390, manufacturing execution system 400 including storage 450, and the external device on the cloud in FIG. 2. In FIG. 6, it is assumed that upper system 300 includes manufacturing execution system 400.

PLC 100 executes a scheduler 640 that manages a plurality of programs executed according to a priority by processor 102 included in PLC 100 within a predetermined cycle such as control cycle 70. The plurality of programs managed by scheduler 640 mainly include a first program and a second program. First program is a program having a high priority executed by the processor in control cycle 70, and can include a program of IO refresh 71 and a control program 154 for the first processing (corresponding to control arithmetic processing 72 and the like) controlling field device 90, for example, the UPG or the MCE. The MCE is a program that generates (calculates) a command value moving (driving) a robot according to a target locus in the case where field device 90 includes the robot.

The second program has a lower priority of the execution than the first program, and includes a program of second processing executed in an idle time of processor 102 in control cycle 70. More specifically, the second processing includes backup processing, and the second program includes backup management program 170.

Scheduler 640 switches the program executed by processor 102 according to the execution priority in control cycle 70, thereby performing IO refresh 71 exchanging the data with field device 90, and performing control arithmetic processing 72 executing UPG 154 based on the field value collected from field device 90 in each control cycle 70. The field value collected from field device 90 may include a state value indicating a state of the control object. PLC 100 executes the instruction of control program 154 to perform control arithmetic processing 72 based on the field value, and transmits the calculated value by control arithmetic processing 72 to field device 90 by IO refresh 71. This calculated value corresponds to a control instruction controlling field device 90. The "control instruction" only needs to be a value related to the control, and includes, but is not limited to, a value (for example, a value (state value) indicating a behavior of the control object) shared between control programs 154 or a value given to the control object (for example, an instruction value and a controlled variable).

When the execution of the first program is completed to end IO refresh 71 and control arithmetic processing 72 in control cycle 70, scheduler 640 causes processor 102 to execute backup management program 170 in idle time 73 of control cycle 70, so that a backup management unit 620 performs the backup processing. More specifically, in idle time 73, change management program 160 is executed, and change detector 601 (see FIG. 1) is implemented. When change detector 601 detects the change of object information 206 in main storage device 106, processor 102 executes backup program 159 to back up object information 206 in main storage device 106. As described above, in idle time 73 of control cycle 70, backup management unit 620 can back up object information 206 stored in main storage device 106.

Backup management unit 620 determines the number of control cycles 70 required to complete the backup (for example, N (≥1)) and a unit information amount M that can be backed up in each of N control cycles 70. Hereinafter, the processing for determining number N of control cycles 70 required for completing the backup is referred to as "determination of the number of backup cycles", and the processing for determining unit information amount M that can be backed up in each of determined N control cycles 70 is referred to as "backup unit amount determination".

More specifically, backup management unit 620 determines N cycles in which the total length of idle time 73 of each control cycle 70 corresponds to the time required for the backup processing. For example, backup management unit 620 calculates the required time for backing up all pieces of object information 206 based on the total information amount to be backed up, a reading speed of main storage device 106, a writing speed of memory card 116 of the "backup destination medium", and the like, and calculates number N of control cycles 70 required for the completion of the backup based on the mathematical division: (the required time/idle time 73 of each control cycle 70). In addition, backup management unit 620 calculates the unit information amount M based on the mathematical division: (total information amount/N to be backed up), and sets the calculated unit information amount M as a parameter of backup program 159, for example, as an argument of backup program 159. When the "backup destination medium" is not memory card 116 but another storage medium such as the storage medium included in support device 500 or HMI 280 or storage 450 (see FIG. 2) included in upper system 300, backup management unit 620 further determines number N of required control cycles 70 and unit information amount M based on the transfer speed of the network and the writing speed of another storage medium.

PLC 100 executes backup program 159 in idle time 73 in each of N control cycles 70 while guaranteeing the execution of control program 154 in control cycle 70. Thus, the backup processing of unit information amount M is executed N times, and the backup of the "object information" can be completed. In the embodiment, idle time 73 of each control cycle 70 is constant, but idle time 73 may be variably set by measuring the required time of IO refresh 71 or control arithmetic processing 72.

Figure 24:
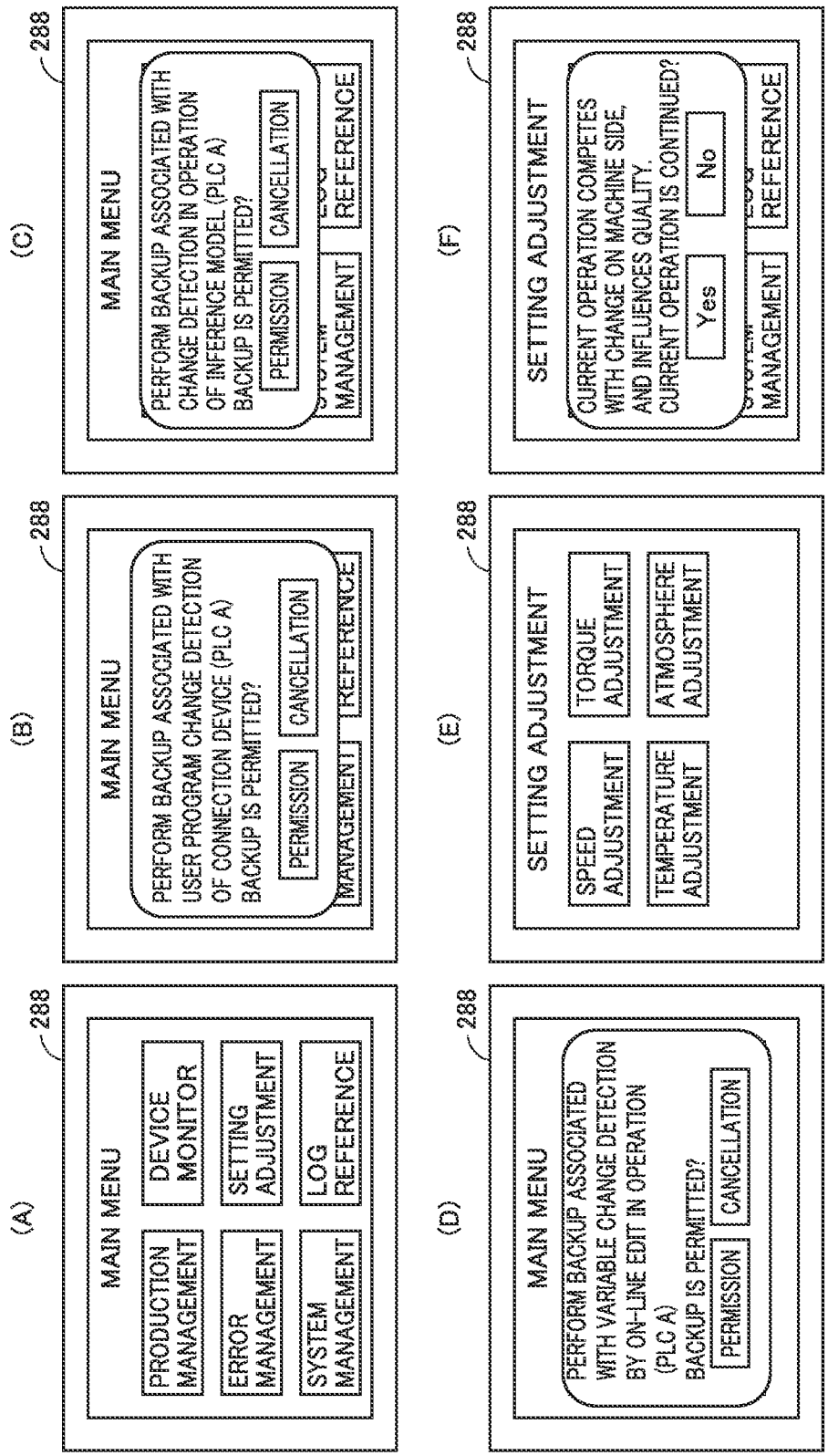
FIG. 24 is a view illustrating an example of a screen constituting a UI displayed for the backup or the restoration, where

Hereinafter, a specific example of the backup of object information 206 and the environment restoring object information 206 stored in the "backup destination medium" will be described. FIG. 24 is a view illustrating an example of a screen constituting the UI displayed for the backup or the restoration. The screen in FIG. 24 is appropriately referred to in the following description.

H. Configuration of Component

Figure 7:
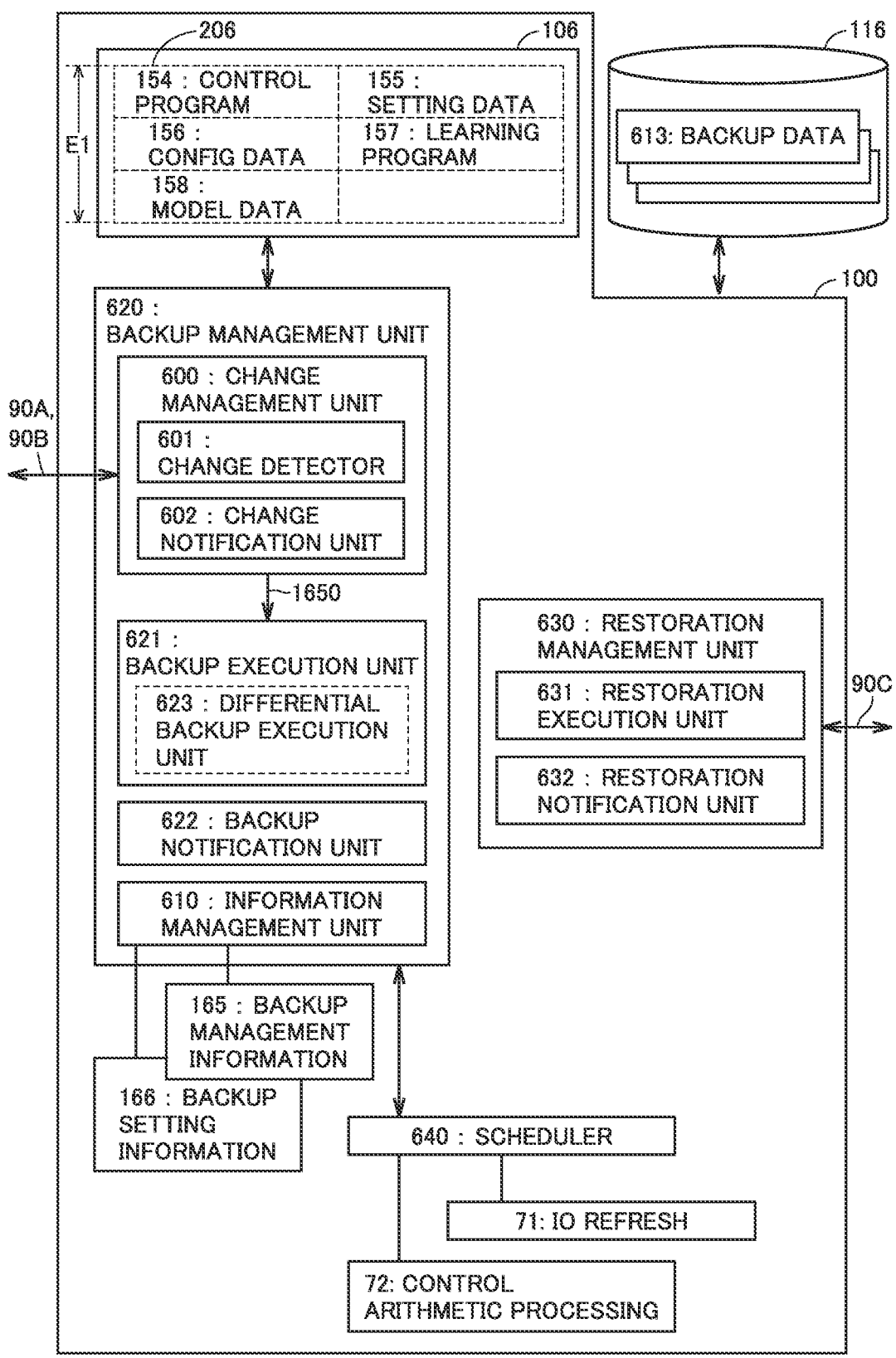
FIG. 7 is a block diagram illustrating components implementing the backup and restoration in a simplified manner according to the embodiment.

FIG. 7 is a block diagram illustrating components implementing the backup and restoration in a simplified manner of the embodiment. With reference to FIG. 67, the components include, as modules, a backup management unit 620 that manages processing for backing up object information 206 of main storage device 106 by executing backup management program 170, a restoration management unit 630 that manages processing for restoring backup data 613 stored in memory card 116 to main storage device 106 by executing restoration management program 180, and a scheduler 640 implemented by executing scheduler program 152.

Backup management unit 620 includes a change management unit 600 implemented by executing change management program 160, a backup execution unit 621 implemented by executing backup program 159, a backup notification unit 622 implemented by executing backup notification program 162, and an information management unit 610 implemented by executing information management program 161. Backup execution unit 621 includes a differential backup execution unit 623 implemented by executing differential backup program 1591. Restoration management unit 630 communicates a restoration notification frame 90C through network 11. Restoration management unit 630 includes a restoration execution unit 631 and a restoration notification unit 632 that are implemented by executing restoration program 163 and restoration processing program 164, respectively. Scheduler 640 causes processor 102 to execute the program of each component of backup management unit 620 in idle time 73 after the end of IO refresh 71 and control arithmetic processing 72 in each control cycle 70 of FIG. 6.

Information management unit 610 manages backup management information 165 and backup setting information 166. Backup setting information 166 includes designation of the "backup destination medium" and designation of the "object information". For example, these pieces of information are set by a user operation.

For example, the information designating the "backup destination medium" is an identifier of one or a plurality of "backup destination media", and the identifier includes an address of the storage medium in the network system 10 and the like. For example, the information designating object information 206 includes an identifier of a program or data of the backup object. For example, when the data is managed in the folder configuration in storage area E1, the identifier may include an identifier of a folder (such as a uniform resource locator (URL)).

Change management unit 600 outputs change specification information 1650 in order to cause backup execution unit 621 to back up object information 206. More specifically, change detector 601 detects that object information 206 is changed based on the presence or absence of the user operation on object information 206 in main storage device 106 or a calculated value calculated from object information 206. When detecting these changes, change detector 601 generates and outputs change specification information 1650 using the user operation content.

The user operation of changing object information 206 can include the online edit operation. FIG. 24 illustrates an example of a graphical user interface (GUI) provided by touch screen 288 of HMI 280 for the online edit operation. For example, when the user performs an operation to select "setting adjustment" as an item on the menu screen of FIG. 24(A), FIG. 24(E) or FIG. 24(F) is displayed in a switched manner, and example, the user can edit (change) setting data 155 by operating a button on FIG. 24(E) or FIG. 24(F). Similar to setting data 155, the user operation can include the online edit operations of control program 154, config data 156, learning program 157, and model data 158.

Figure 8:
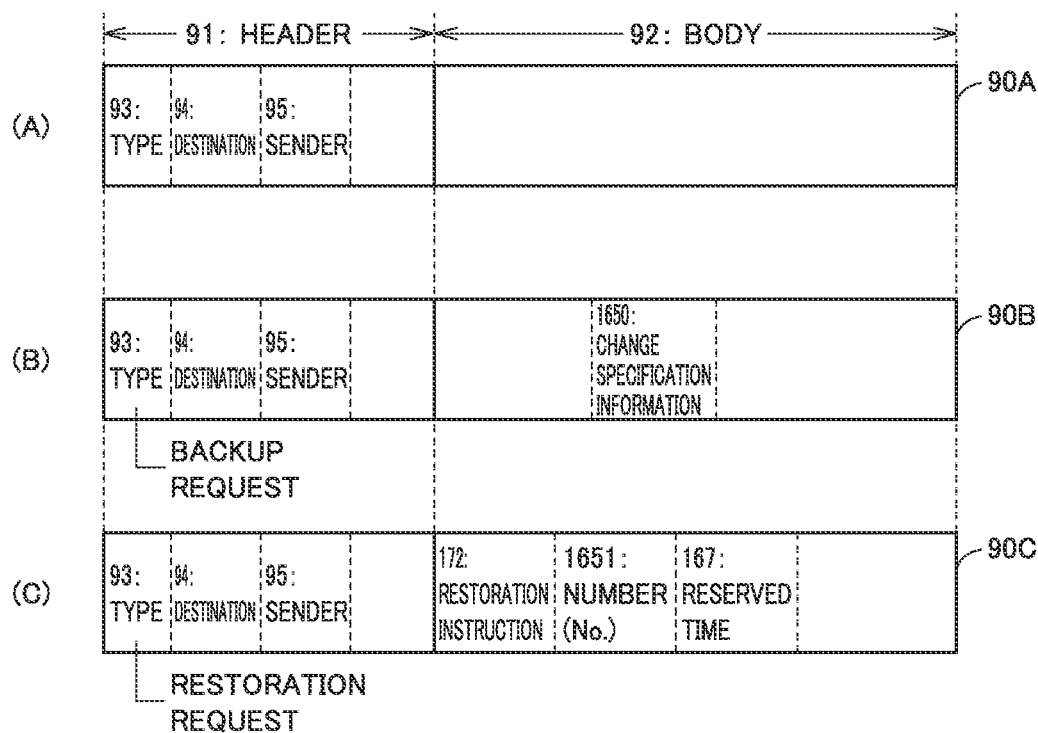
FIG. 8 is a view illustrating a configuration example of a frame according to the embodiment, where FIG. 8 (A) illustrates a notification frame, FIG. 8 (B) illustrates a change notification frame, and FIG. 8 (C) illustrates a restoration notification frame.

In the case where change detector 601 of a change notification unit 602 detects the change of object information 206 in main storage device 106, when a predetermined user operation is received, change notification unit 602 generates a change notification frame 90B (FIG. 8 (B)) and transmits change notification frame 90B through network 11. Change notification frame 90B includes a request causing another PLC 100 to execute the backup processing. Details of change notification frame 90B will be described later.

Change management unit 600 further communicates a notification frame 90A through network 11, analyzes change notification frame 90B received from another PLC 100, and outputs change specification information 1650 based on the analysis result.

Backup execution unit 621 receives change specification information 1650 output from change management unit 600. When receiving change specification information 1650, backup execution unit 621 backs up object information 206 in main storage device 106. More specifically, when whether to execute backup 1657 (FIG. 9) included in change specification information 1650 indicates "execute", backup execution unit 621 reads (copies) object information 206 based on backup setting information 166, and stores read object information 206 in the "backup destination medium" designated by backup setting information 166. For example, when memory card 116 is designated as the "backup destination medium", backup execution unit 621 stores object information 206 in memory card 116 as backup data 613. Thus, object information 206 is backed up.

Backup notification unit 622 transmits various notifications related to the backup processing through network 11, and outputs the notifications to the user through HMI 280, support device 500, and the display of operation panel 129 of PLC 100 that is the own device.

Information management unit 610 receives change specification information 1650 output from change management unit 600. Information management unit 610 registers the information based on the received change specification information 1650 as backup management information 165.

Restoration execution unit 631 performs the restoration, and restoration notification unit 632 transmits various notifications regarding the restoration through network 11 and outputs the notifications to the user through HMI 280, support device 500, and the display included in operation panel 129 of PLC 100 that is the own device. Although the configuration example in which necessary functions are provided by processor 102 executing the program has been described in FIG. 7, some or all of these provided functions may be implemented using a dedicated hardware circuit (for example, an application specific integrated circuit (ASIC) and a field-programmable gate array (FPGA)). Alternatively, the main part of PLC 100 may be implemented using hardware (for example, an industrial personal computer based on a general-purpose personal computer) according to a general-purpose architecture. In this case, a plurality of operating systems (OSs) having different uses may be executed in parallel using a virtualization technology, and the necessary application may be executed on each OS.

(h1. Configuration of Frame)

FIG. 8 is a view illustrating a configuration example of the frame of the embodiment. In the embodiment, PLC 100 communicates with another PLC 100 using, for example, the frame in FIG. 8 in connection with the backup or the restoration. The communication between PLCs 100 is not limited to the frame format, and for example, may be a packet format or the like.

With reference to notification frame 90A in FIG. 8 (A), the frame basically includes a header 91 and a body 92 that stores payloads indicating various notifications. Header 91 stores information indicating a type 93, a destination 94, and a sender 95 of frame 90A. Change notification frame 90B in FIG. 8 (B) stores change specification information 1650 in body 92. In header 91 of change notification frame 90B, type 93 indicates a "backup request", sender 95 indicates the information identifying PLC 100 of the source, and destination 94 indicates the information identifying at least one PLC 100 connected to network 11. Here, for example, a multicast address designating all PLCs 100 connected to network 11 is set as destination 94 of change notification frame 90B. When receiving change notification frame 90B through network 11, change management unit 600 of PLC 100 extracts change specification information 1650 from body 92 of change notification frame 90B and outputs change specification information 1650.

In restoration notification frame 90C of FIG. 8 (C), in order to request each PLC 100 to execute the restoration, type 93 of header 91 indicates a "restoration request", and body 92 includes a restoration instruction 172, a number 1651 identifying the data of the restoration object, and a reserved time 167 reserving the restoration execution.

(h2. Backup Management Information 165)

Figure 9:
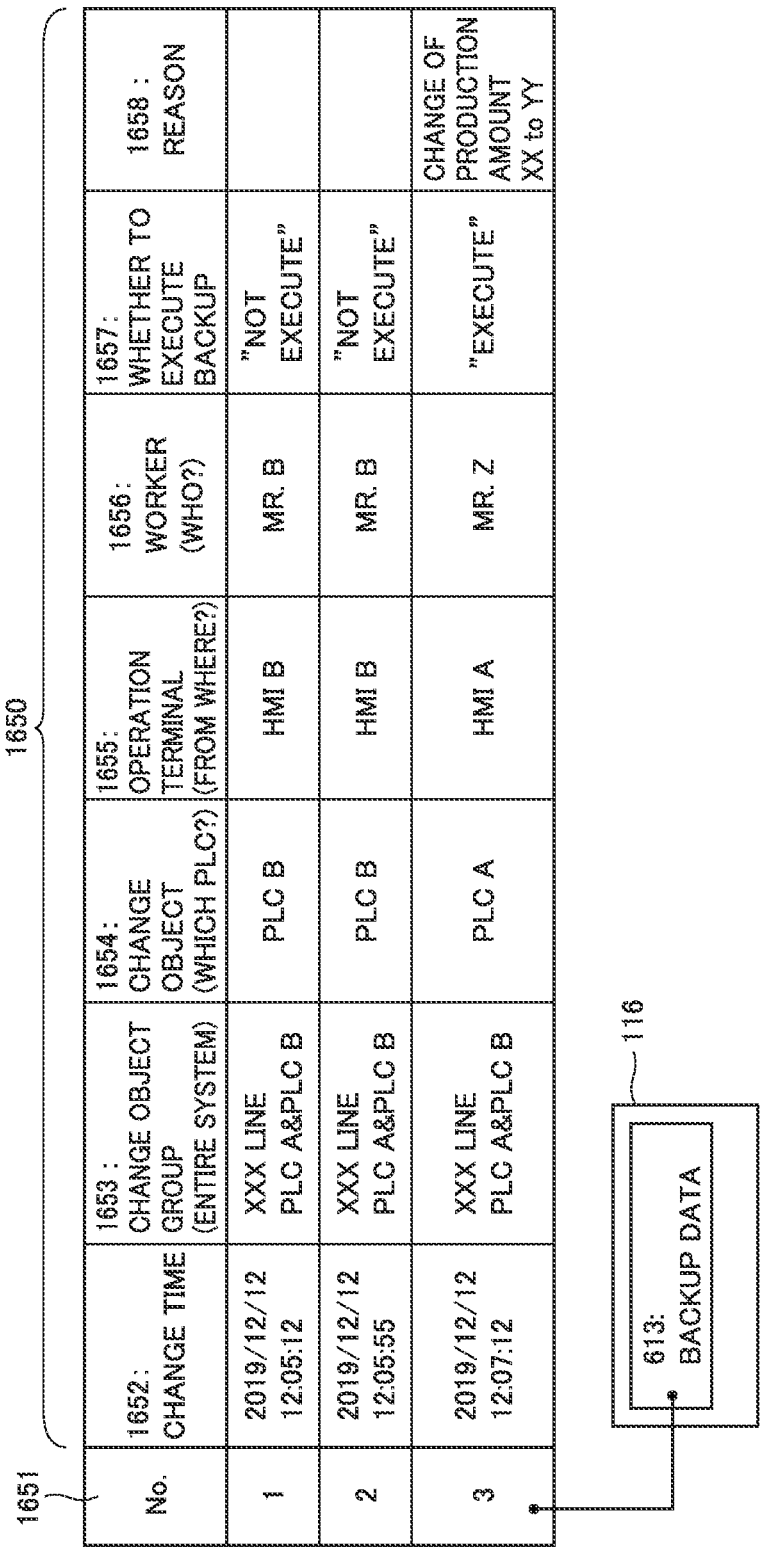
FIG. 9 is a view illustrating an example of backup management information.

FIG. 9 is a view illustrating an example of backup management information 165. Backup management information 165 has a table format in which a plurality of records are registered, and each record includes number 1651 identifying the record and change specification information 1650. Change specification information 1650 of each record includes change specification information 1650 generated by change management unit 600 of own PLC 100 or change specification information 1650 extracted from change notification frame 90B received from another PLC 100. When receiving change specification information 1650 from change management unit 600, information management unit 610 generates the record based on received change specification information 1650 and registers the record in the table of backup management information 165. With reference to FIG. 9, change specification information 1650 of the record of backup management information 165 includes the data indicating a change time 1652, a change object group 1653, a change object 1654, an operation terminal 1655, a worker 1656, whether to execute backup 1657, and a reason 1658 for executing backup.

Change time 1652 of change specification information 1650 of the record is the time when change specification information 1650 is received, and more specifically, indicates the time when the change of object information 206 is detected or the time when the backup processing is performed. Change object group 1653 indicates information designating at least one PLC 100 to be subjected to the backup processing in synchronization (simultaneously). Here, all PLCs 100 of control system 1 are designated.

Change object 1654 indicates an identifier identifying PLC 100 that generates change specification information 1650. For example, when PLC 100B has backup management information 165 in FIG. 9, change object 1654 basically indicates the identifier of PLC 100B. However, when PLC 100B receives change specification information 1650 from another PLC 100 as change notification frame 90B, change object 1654 indicates the identifier of another PLC 100. For example, because change object 1654 of the record in which number 1651 in FIG. 9 indicates "3" indicates "PLCA", change specification information 1650 about the record indicates that PLC 100B is the information received as change notification frame 90B from PLC 100A.

Operation terminal 1655 and worker 1656 indicate the identifier of the terminal (HMI 280, support device 500, PLC) that receives the user operation of changing the "object information" corresponding to change specification information 1650 and the identifier of the user, respectively.

Whether to execute backup 1657 indicates the presence or absence of the instruction instructing processor 102 to execute the backup processing, and includes the backup instruction causing backup execution unit 621 to execute the backup. More specifically, when "execute" is set to whether to execute backup 1657, whether to execute backup 1657 includes the backup instruction, and when "not performed" is set to whether to execute backup 1657, whether to execute backup 1657 does not include the backup instruction. Reason 1658 indicates the reason (for example, change in production amount, change in production type, and the like) why object information 206 is changed.

For example, in the case where whether to execute backup 1657 of the backup of the record of which number 1651 is "3" indicates "execute", when backup execution unit 621 backs up object information 206 according to the backup instruction, information management unit 610 associates (ties up) backup data 613 of object information 206 backed up to memory card 116 with the record of which number 1651 indicates "3" as illustrated in FIG. 9.

As described above, when change detector 601 of PLC 100 detects the change of object information 206, information management unit 610 generates change specification information 1650 and stores change specification information 1650 as backup management information 165. Information management unit 610 stores change specification information 1650 extracted from change notification frame 90B indicating that the change of object information 206 in another PLC 100 is detected as backup management information 165. Accordingly, information management unit 610, by backup management information 165 in FIG. 9, can manage the history in which object information 206 is changed in PLC 100 of the own device and the history in which the backup is performed for object information 206.

(h3. Backup Based on Backup Management Information 165)

When receiving change specification information 1650 from change management unit 600, backup execution unit 621 analyzes change specification information 1650, and starts the backup according to the backup instruction when it is determined that whether to execute backup 1657 indicates "YES" based on the analysis result. More specifically, backup management unit 620 outputs the number of cycles N and unit information amount M of control cycle 70 determined by "backup cycle determination" and "backup unit amount determination" to scheduler 640, and sets unit information amount M in backup program 159. Scheduler 640 executes backup program 159 in idle time 73 in each of N control cycles 70. When executed, backup program 159 backs up unit information amount M of object information 206. Thus, object information 206 is backed up by unit information amount M in idle time 73 of each of N control cycles 70 by backup execution unit 621 implemented by executing backup program 159, and as a result, object information 206 is backed up over N control cycles 70.

Figure 10:
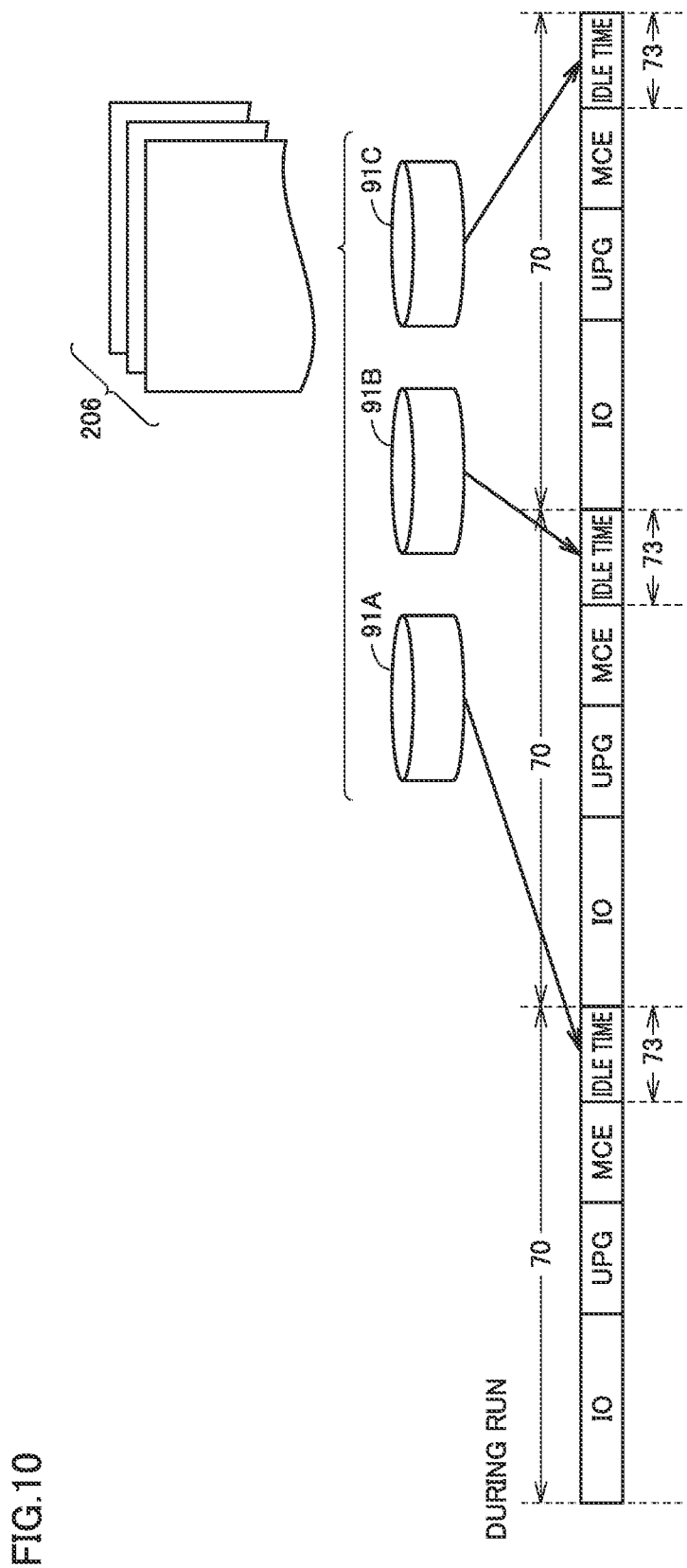
FIG. 10 is a view schematically illustrating a backup scene using N control cycles and a unit information amount M.

FIG. 10 is a view schematically illustrating a backup scene using N control cycles 70 and unit information amount M. FIG. 10 illustrates the case where object information 206 is divided into three pieces of unit information 91A, 91B, and 91C each of which has unit information amount M, and backed up in three control cycles 70 as the number of cycles N. In FIG. 10, during the operation ("during RUN" in FIG. 10), the backup of object information 206 is completed while control cycle 70 is maintained over three control cycles 70. In this manner, backing up object information 206 while the object information is divided into a plurality of pieces of unit information is also referred to as "division backup".

I. Change Detection and Update of Backup Management Information

Figure 11:
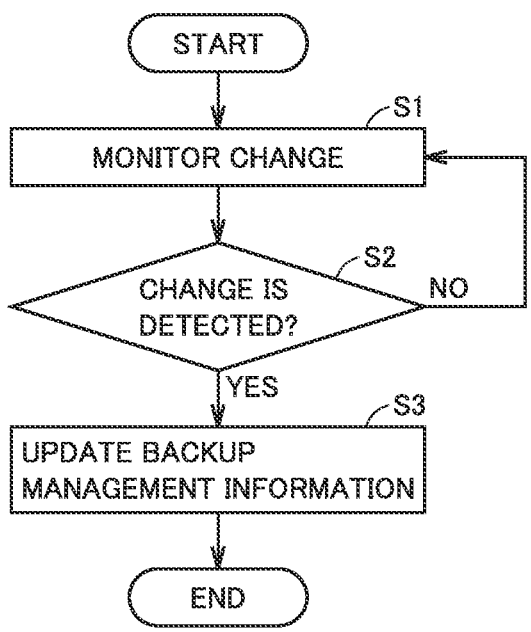
FIG. 11 is a flowchart illustrating processing for detecting change and updating the backup management information according to the embodiment.
Figure 12:
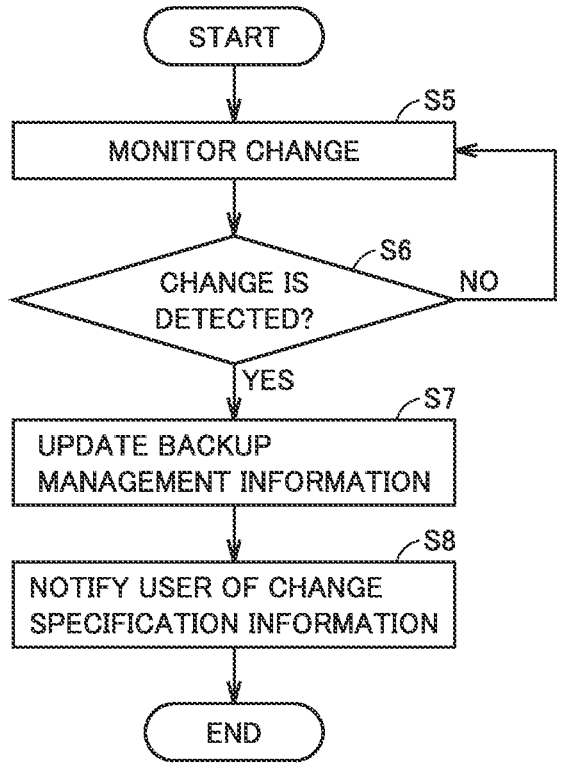
FIG. 12 is a flowchart illustrating processing for detecting the change and updating the backup management information according to the present embodiment.

FIGS. 11 and 12 are flowcharts illustrating processing for detecting the change and processing for updating backup management information 165 of the embodiment. FIG. 11 illustrates the processing in the case where one PLC 100 is connected to control system 1, and FIG. 12 illustrates the processing in the case where the plurality of PLCs 100 are connected to control system 1.

With reference to FIG. 11, PLC 100 monitors object information 206 of the own device using change detector 601, and when change detector 601 detects the change of object information 206 (step S1, YES in step S2), PLC 100 acquires change specification information 1650 from the user operation content using change management unit 600, and registers the record of acquired change specification information 1650 in backup management information 165 and updates backup management information 165 using information management unit 610 (step S3). When change detector 601 does not detect the change of object information 206 (NO in step S2), the process returns to step S1.

With reference to FIG. 12, one PLC 100 of control system 1 monitors object information 206 of the own device using change detector 601, and when change detector 601 detects the change of object information 206 (step S5, YES in step S6), PLC 100 acquires change specification information 1650 from the user operation content using change management unit 600, and registers the record of acquired change specification information 1650 in backup management information 165 to update backup management information 165 using information management unit 610 (step S7).

When whether to execute backup 1657 of change specification information 1650 acquired from the user operation content indicates "execute" in step S7, PLC 100 causes backup notification unit 622 to generate change notification frame 90B including change specification information 1650 and transmit change notification frame 90B to network 11 (step S8). When change detector 601 does not detect the change of object information 206 (NO in S6), the process returns to step S5.

Change notification 602 may notify the user of the detection of the change of object information 206 through the display of operation panel 129 or through HMI 280 or support device 500.

J. Backup Processing

Figure 13:
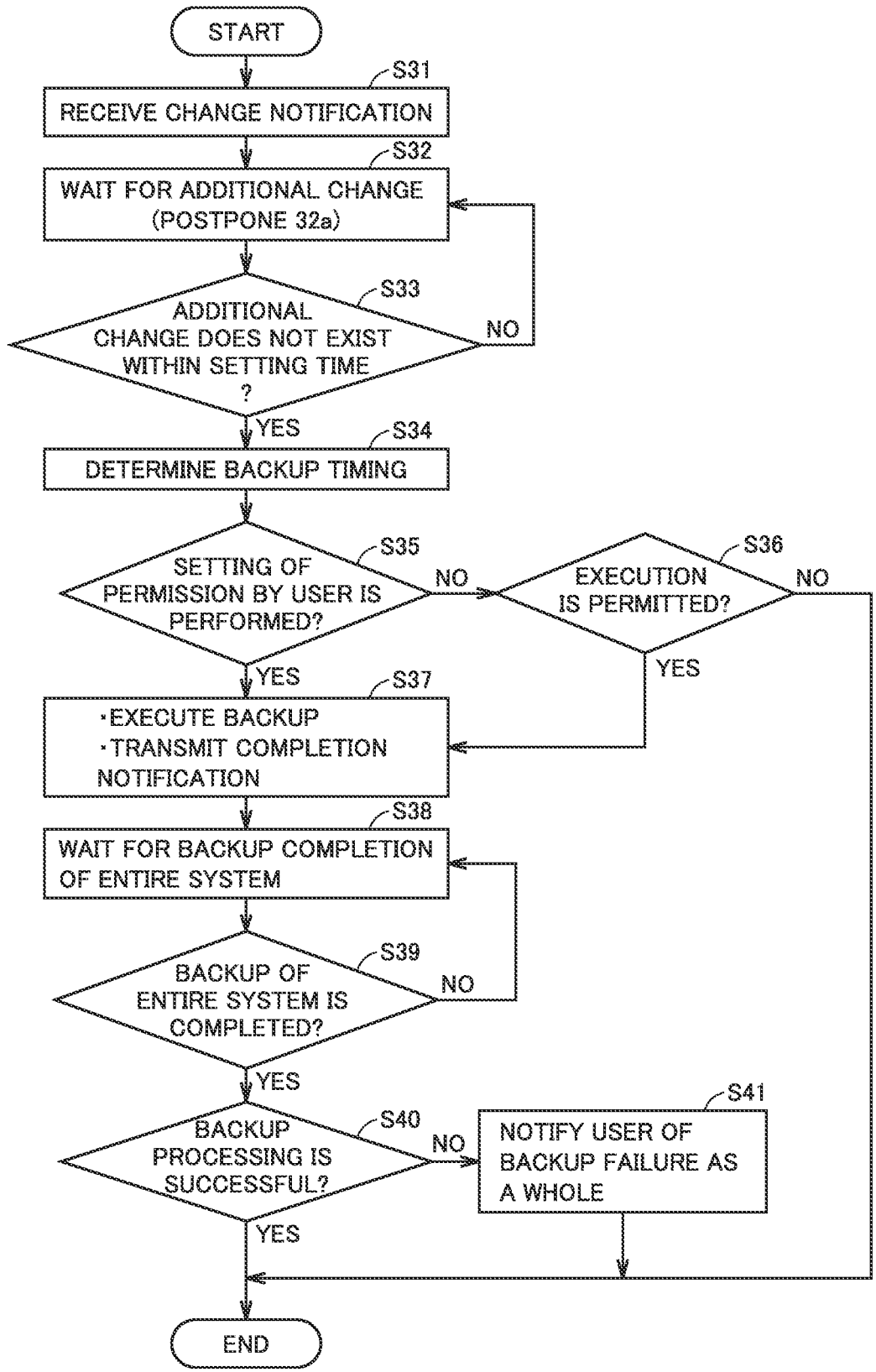
FIG. 13 is a flowchart illustrating backup processing according to the embodiment.
Figure 14:
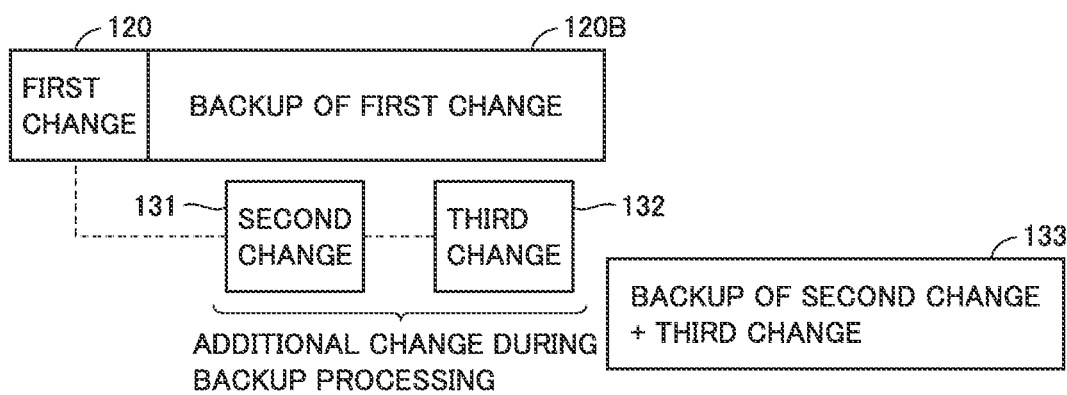
FIG. 14 is a view schematically illustrating a case where an additional change in the backup processing is detected.

FIG. 13 is a flowchart illustrating backup processing of the embodiment. FIG. 14 is a view schematically illustrating the case where an additional change in the backup processing is detected. With reference to FIG. 13, the backup processing in control system 1 having the network configuration in which the plurality of PLCs 100 are connected will be described. In PLC 100 of control system 1, when change management unit 600 receives change notification frame 90B indicating "execute" and including whether to execute backup 1657 including the backup instruction (step S31), backup execution unit 621 executes the backup of object information 206 according to the backup instruction. The case that PLC 100 backs up object information 206 is not limited to the case that change notification frame 90B is received from another PLC 100. For example, when change detector 601 detects the change in object information 206 of own device, the backup of object information 206 may be performed.

After receiving change notification frame 90B in step S31, PLC 100 repeats the determination whether there is the additional change to object information 206 by change detector 601 within a previously set time (step S32, NO in step S33). When change detector 601 detects the additional change to object information 206 within the set time, PLC 100 does not back up object information 206 after the additional change but executes postpone 32a to be put off.

With reference to FIG. 14, postpone 32a will be described. More specifically, when first change 120 that is the change to object information 206 is detected in step S31, PLC 100 backs up the first change of object information 120B indicating object information 206 including the change portion by first change 120 using backup execution unit 621. The backup of object information 206 (that is, object information 120B having second change 131 and third change 132 that indicate the change contents with respect to object information 206) detected before the completion of the backup is postponed as the backup of the "object information having the second change+the third change" 133 in FIG. 14.

When change management unit 600 detects that the set time elapses (YES in step S33), PLC 100 causes backup execution unit 621 to determine the timing at which the backup is executed (step S34). More specifically, PLC 100 causes backup management unit 620 to execute the pieces of processing for "determining the backup cycle" and "determining the backup unit amount" to determine number N that is the backup timing and unit information amount M that are the backup timings (step S34). Backup management unit 620 determines whether the "setting of execution permission by user" is performed based on the user operation received through the GUI in FIG. 24(B) or FIG. 24(D) (step S35). The user can set the permission to execute the backup (alternatively, the setting of permission is canceled) by operating such the GUI.

When PLC 100 determines that the "setting of execution permission by user" is not performed based on the user operation (NO in step S35), backup management unit 620 determines whether the "setting of execution permission by user" is performed based on the user operation through the GUI in FIG. 24(B) or 24(D) (step S36). When it is determined that "setting of execution permission by user" is performed (YES in step S35, YES in step S36), the processing proceeds to step S37. When PLC 100 determines, by backup management unit 620, that the "setting of execution permission by user" is not performed based on the user operation received through the GUI (NO in step S36), the processing in FIG. 13 is ended without performing the backup.

In step S37, PLC 100 performs the backup and outputs the backup completion notification (step S37). More specifically, PLC 100 causes backup execution unit 621 to make the division backup of object information 206 by unit information amount M in idle time 73 of each of N control cycles 70. When the backup of object information 206 is completed, PLC 100 transmits frame 90A of the backup completion notification to network 11 using backup notification unit 622. The address of PLC 100 indicated by change object group 1653 included in change specification information 1650 of change notification frame 90B received in step S31 is set as destination 94 of frame 90A of the backup completion notification.

While it is not determined that the backup of entire control system 1 is completed (NO in step S39), PLC 100 waits for the backup completion of entire control system 1 (step S38). More specifically, when the backup of object information 206 of the own device is completed, PLC 100 determines, by backup management unit 620, whether frame 90A of the backup completion notification is received from all of at least one PLC 100 indicated by change object group 1653. When it is determined that the backup is received, PLC 100 determines whether the backup of entire control system 1 succeeds (YES in step S39).

For example, PLC 100 determines that the backup processing is successful (YES in step S40) when backup management unit 620 can receive notification frame 90A notifying the backup completion from all of at least one PLC 100 indicated by change object group 1653 until a predetermined time elapses after the backup completion of object information 206 of the own device, and the processing in FIG. 13 ends. On the other hand, when notification frame 90A notifying the backup completion cannot be received from all of at least one PLC 100 indicated by change object group 1653, PLC 100 does not determine that the backup processing is successful (NO in step S40), PLC 100 notifies the user of the backup failure of entire control system 1 (step S41), and the processing in FIG. 13 ends.

K. Division Backup

Figure 15:
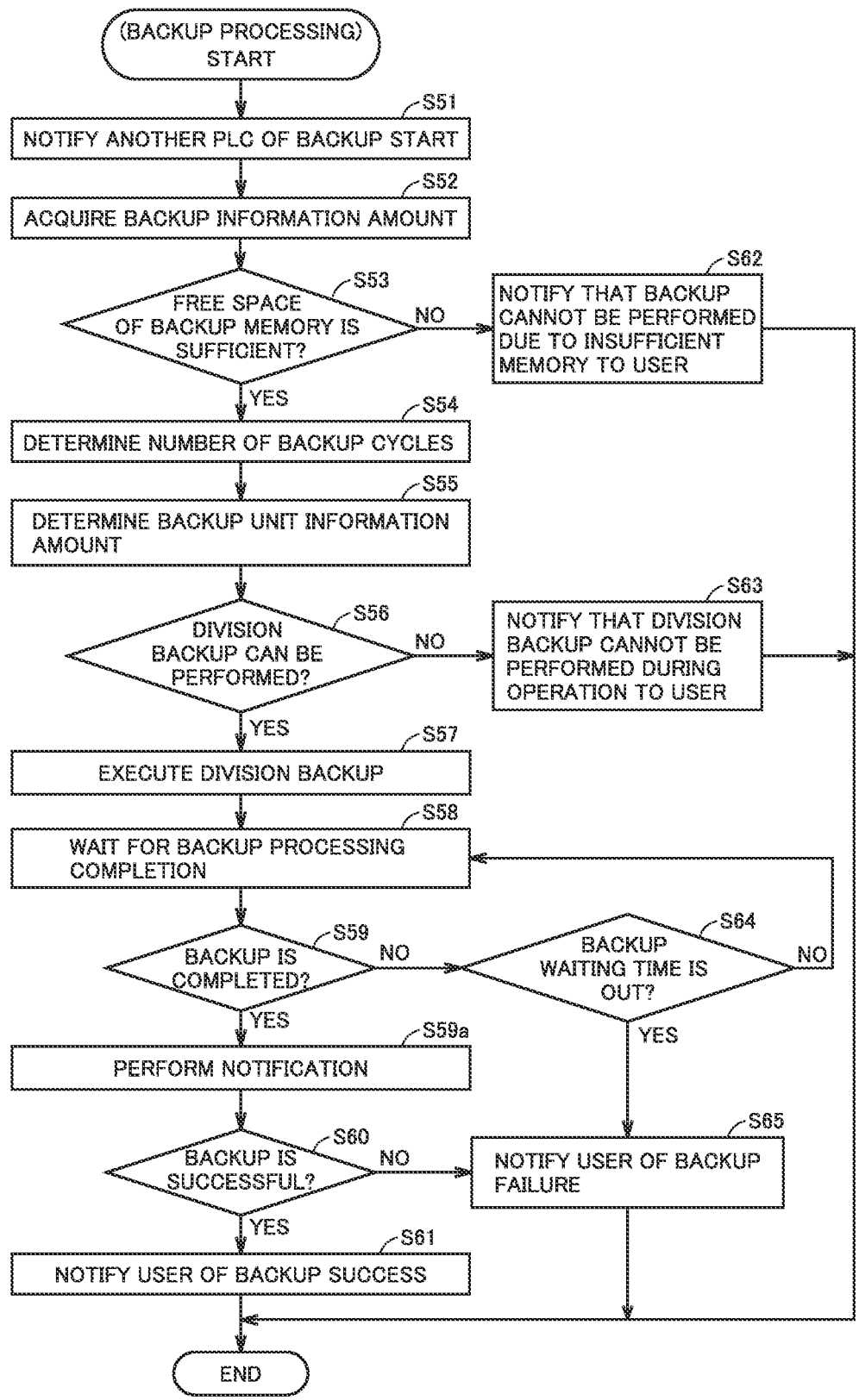
FIG. 15 is a flowchart illustrating an example of processing of step S37 in FIG. 13.

FIG. 15 is a flowchart illustrating an example of processing of step S37 in FIG. 13. With reference to FIG. 15, the case where the division backup is that memory card 116 is the "backup destination medium" will be described.

When backup execution unit 621 starts the backup operation, backup notification unit 622 of PLC 100 transmits notification frame 90A notifying the start of the backup operation in PLC 100 to another PLCs through network 11 (step S51). PLC 100 acquires the information amount of object information 206 using backup management unit 620 (step S52) and acquires the free space of memory card 116 that is the "backup destination medium" designated by backup setting information 166. PLC 100 compares the information amount of object information 206 with the free space of memory card 116 using backup management unit 620, and determines whether the free space of the backup memory is sufficient based on the comparison result (step S53). When backup management unit 620 of PLC 100 determines that the free space of memory card 116 backing up object information 206 is not sufficient (NO in step S53), backup notification unit 622 of PLC 100 outputs the notification that the backup cannot be performed due to the insufficient memory to the user (step S62).

When it is determined that the free space of the backup memory backing up object information 206 is sufficient (YES in step S53), PLC 100 causes backup management unit 620 to perform "determination of the number of backup cycles" and "determination of the backup unit amount" (steps S54, S55). Accordingly, N control cycles 70 and unit information amount M are determined.

PLC 100 compares N that is the number of control cycles 70 and unit information amount M with the backup allowable threshold indicated by backup setting information 166 using backup management unit 620, and determines whether the division backup can be performed based on the comparison result (step S56). When the comparison result indicates that N pieces of control cycle 70 or unit information amount M exceeds the threshold value, PLC 100 determines that the division backup cannot be performed (NO in step S56), and backup notification unit 622 outputs the notification indicating that the division backup during the operation cannot be performed to the user (step S63).

When the comparison result indicates that N control cycles 70 and unit information amount M are less than or equal to the threshold, PLC 100 determines that the division backup can be performed (YES in step S56), and PLC 100 executes backup program 159 in idle time 73 in each of N control cycles 70 using scheduler 640 such that the division backup is executed (step S57). Thus, the division backup is started by backup execution unit 621.

While waiting for the completion of the division backup processing (step S58), PLC 100 determines, by backup management unit 620, whether the division backup is completed within a predetermined backup waiting time (NO in step S59, NO in S64).

When backup management unit 620 determines that the division backup is completed within the backup waiting time (YES in S59), PLC 100 transmits, by backup notification unit 622, notification frame 90A notifying another PLC 100 of the backup completion through network 11 (step S59a). PLC 100 determines whether the backup is successful based on whether backup management unit 620 receives backup completion notification frame 90A from all other PLCs 100 (step S60). When the division backup is not completed within the backup waiting time to determine the timeout by backup management unit 620 (YES in step S64), or when the backup completion notification is not received from all other PLCs 100 not to determine the backup is successful (NO in step S60), backup notification unit 622 outputs the notification indicating that the backup fails to the user (step S65).

When backup management unit 620 receives notification frame 90A of the backup completion from all other PLCs 100 (YES in step S60), PLC 100 determines that the division backup is successful, and outputs the notification of the backup success to the user using backup notification unit 622 (step S61).

(k1. Division Backup to Upper System)

Figure 16:
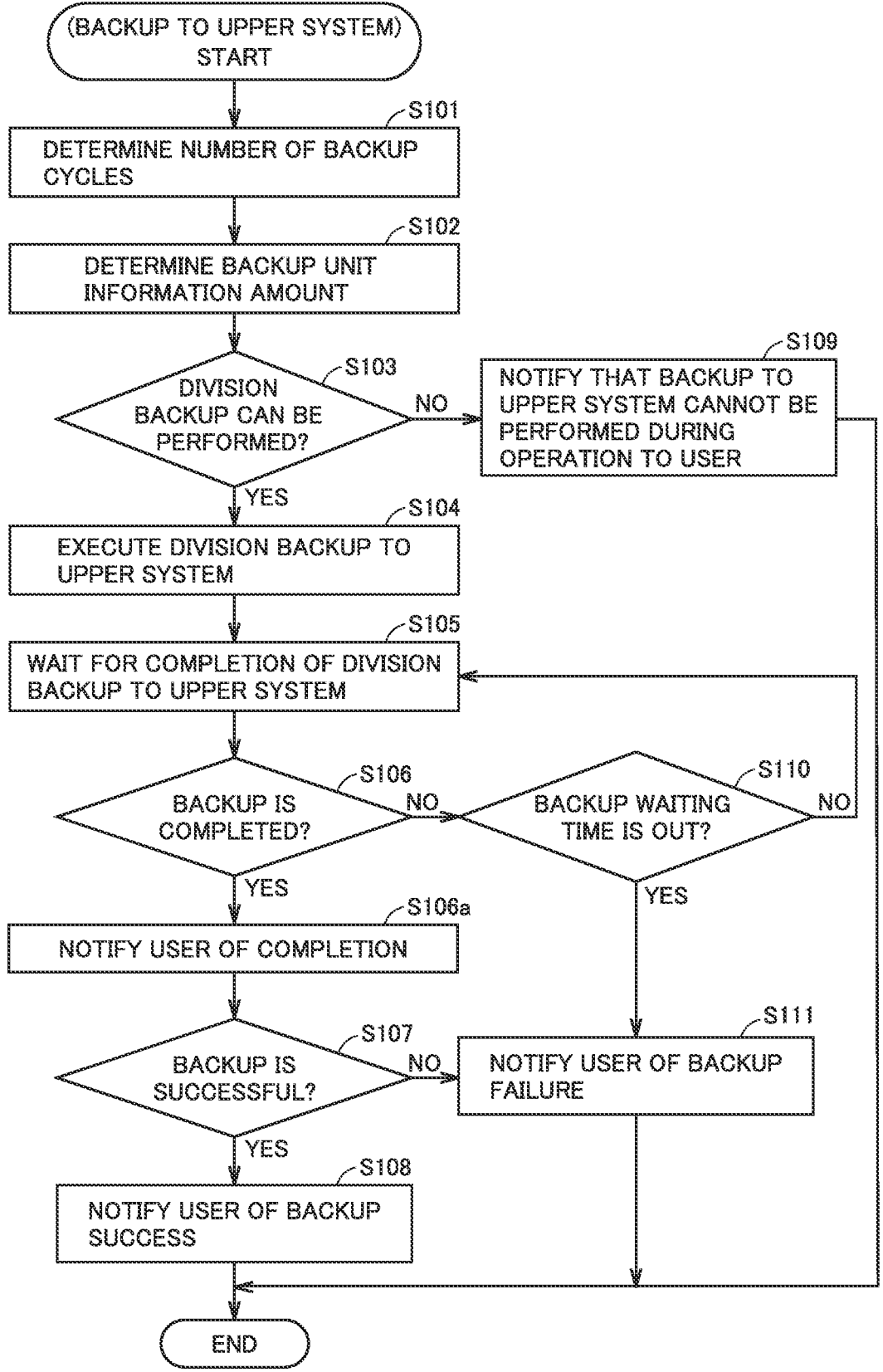
FIG. 16 is a flowchart illustrating another example of the processing of step S37 in FIG. 13.

FIG. 16 is a flowchart illustrating another example of the processing of step S37 in FIG. 13. With reference to FIG. 16, the case where the storage medium that is a non-local memory of PLC 100 and is provided by, for example, upper system 300 is set as the "backup destination medium" in backup setting information 166 will be described. More specifically, for example, the case where storage 450 included in manufacturing execution system 400 is set as the "backup destination medium" in backup setting information 166 will be described.

PLC 100 causes backup management unit 620 to perform the "determination of the number of backup cycles" and the "determination of the backup unit amount" (steps S101, S102). More specifically, backup management unit 620 calculates the required time backing up all pieces of object information 206 based on the total information amount of object information 206, the reading speed of main storage device 106, the writing speed of storage 450 that is the "backup destination medium", the transfer speed of the network between PLC 100 and manufacturing execution system 400, and the like, and calculates the number of cycles N of control cycle 70 and unit information amount M based on the number of cycles N based on the mathematical division: (calculated required time/idle time 73 of each control cycle 70).

PLC 100 compares N pieces of determined control cycles 70 and unit information amount M with the threshold of the allowable backup to the upper system indicated by backup setting information 166 using backup management unit 620, and determines whether the division backup can be performed based on the comparison result (step S103). When the comparison result indicates that N pieces of the control cycles 70 or unit information amount M exceeds the threshold, it is not determined that the division backup can be executed (NO in step S103), and PLC 100 outputs, by backup notification unit 622, the notification indicating that the division backup cannot be executed to the upper system during the operation to user (step S109).

When the comparison result indicates that N control cycles 70 and unit information amount M are less than or equal to the threshold, it is determined that the division backup can be performed (YES in step S103), and PLC 100 causes scheduler 640 to execute backup program 159 in idle time 73 in each of N control cycles 70 in order to execute the division backup to the upper system (step S104). PLC 100 waits for the backup completion (step S105). PLC 100 determines whether the division backup is completed within a predetermined backup waiting time by backup management unit 620 (NO in steps S106, S110).

When backup management unit 620 determines that the division backup is completed within the backup waiting time (YES in S106), PLC 100 transmits notification frame 90A notifying the backup completion to another PLC 100 by backup notification unit 622 (step S106a). PLC 100 determines whether the backup is successful based on whether backup management unit 620 receives backup completion notification frame 90A from all other PLCs 100 (step S107). When backup management unit 620 determines that the division backup is not completed within the backup waiting time (NO in step S106, YES in step S110), or when notification frame 90A indicating the backup completion is not received from all other PLCs 100 (NO in step S107), PLC 100 outputs the notification indicating that the backup fails to the user using backup notification unit 622 (step S111).

When backup management unit 620 determines that the division backup succeeds (YES in step S107), PLC100 outputs the backup success notification to the user by backup notification unit 622 (step S108).

In the embodiment, a local memory of PLC 100 such as memory card 116 and the storage medium of the non-local memory included in the upper system may be combined as the "backup destination medium". In such the combination, object information 206 can be backed up and stored in both the local memory and the non-local memory (for example, the storage medium included in upper system 300) of PLC 100.

L. Differential Backup

Figure 17:
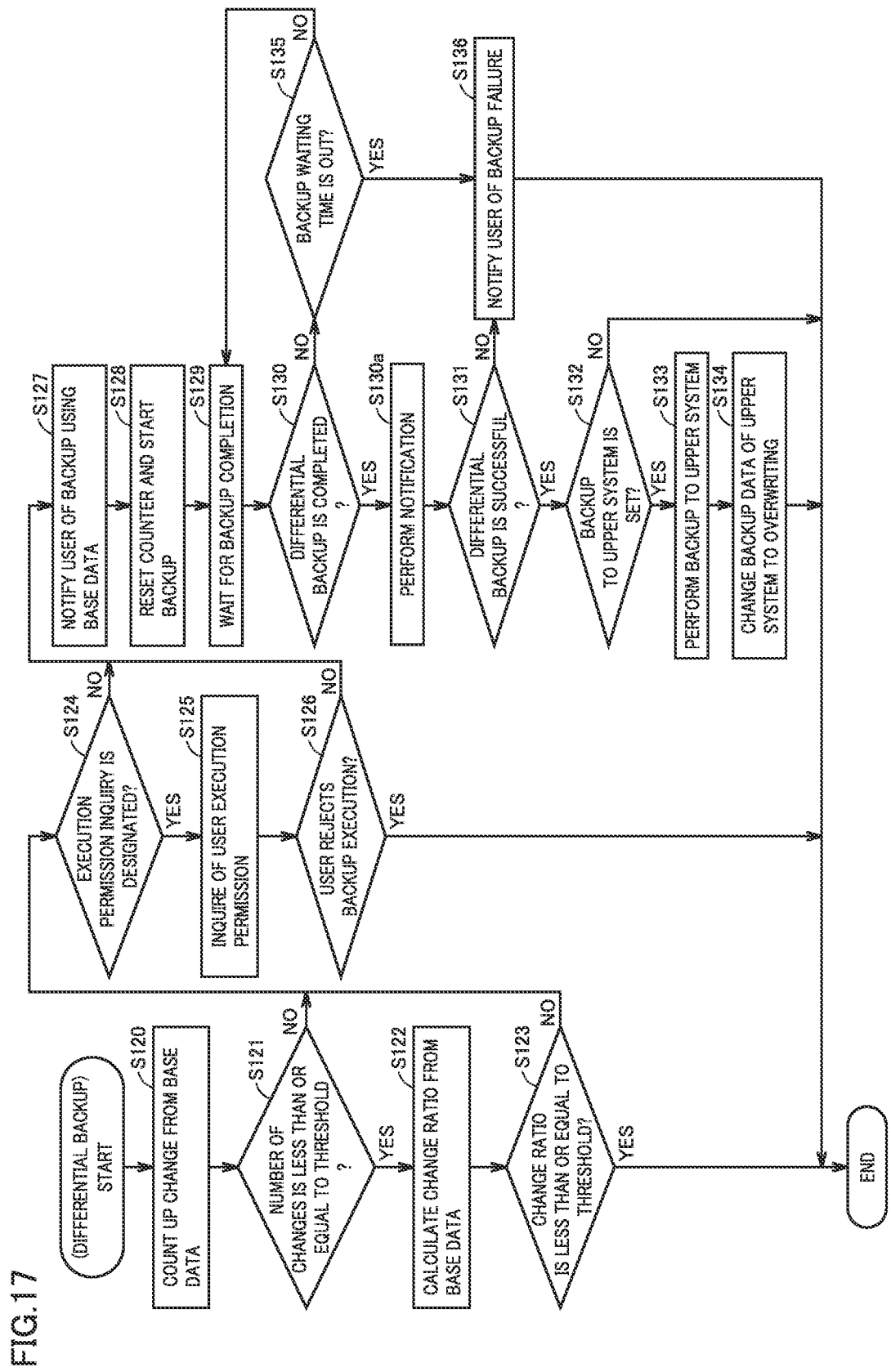
FIG. 17 is a flowchart illustrating differential backup processing according to the embodiment.
Figure 18:
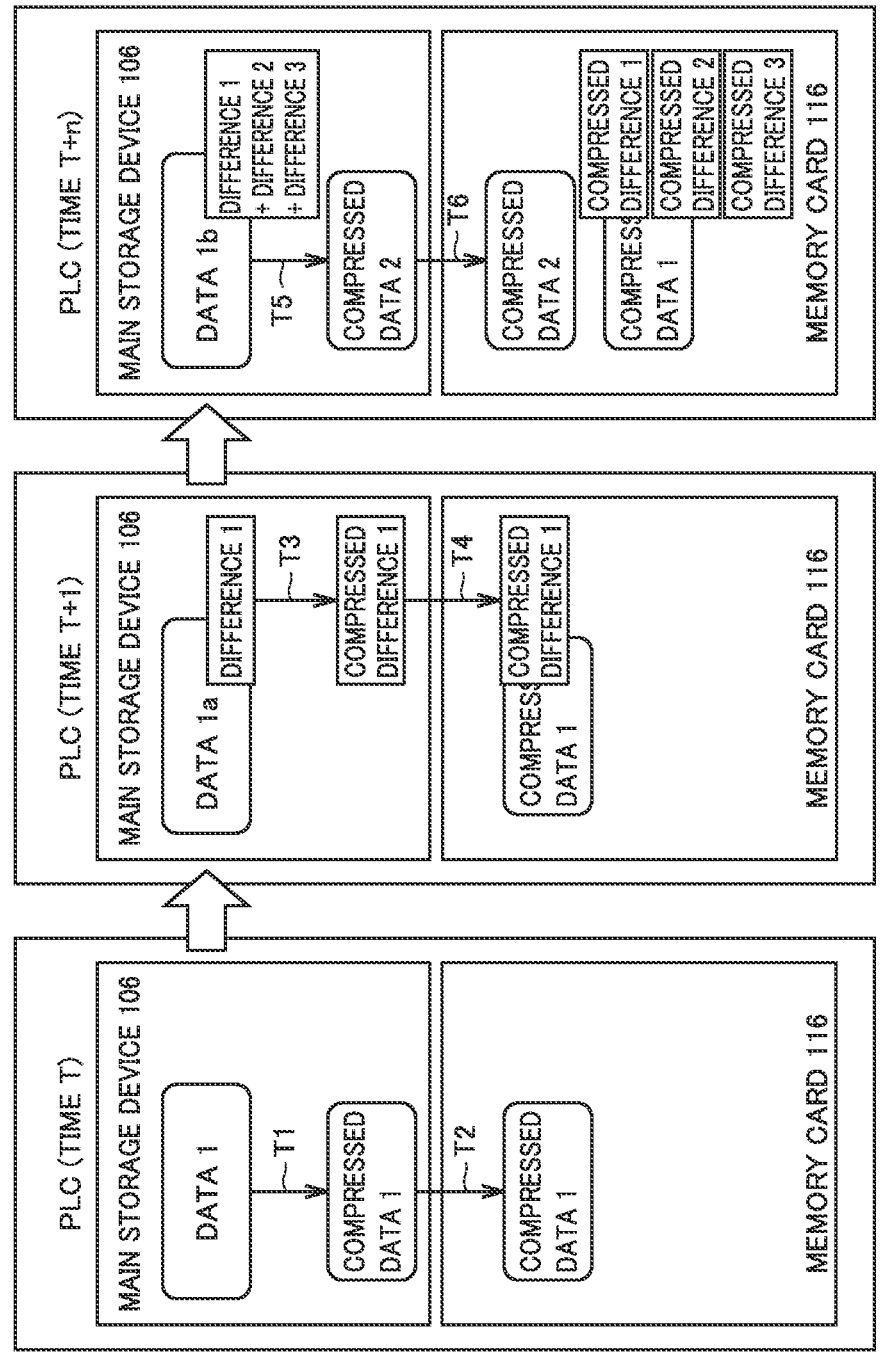
FIG. 18 is a view schematically illustrating a procedure of differential backup according to the embodiment.

FIG. 17 is a flowchart illustrating differential backup processing of the embodiment. FIG. 18 is a view schematically illustrating a procedure of differential backup of the embodiment. In the embodiment, during the operation, PLC 100 performs the differential backup of object information 206 using differential backup execution unit 623. In the differential backup, every time change detector 601 detects the change of object information 206, PLC 100 compares object information 206 after the change with the base data, namely, original object information 206 before the change using backup management unit 620, and acquires "difference" corresponding to the changed partial information in object information 206 based on the comparison result.

With reference to FIG. 18, at a time T, backup execution unit 621 backs up all "data 1" of object information 206 (steps T1, T2). In steps T1, T2, backup execution unit 621 performs the division backup in FIG. 15. In the division backup, the "data 1" is compressed, and "compressed data 1" is stored in memory card 116 of the "backup destination medium" by the division backup. The "compressed data 1" is base data detecting the difference. The base data may be in a format that is not compressed as long as the base data is data obtained by copying the "data 1".

When change detector 601 detects the change of the "data 1" at a subsequent time T+1, backup management unit 620 determines whether the number of changes of the original "data 1" exceeds the threshold. When it is determined that the number of changes does not exceed the threshold, backup management unit 620 compares "data 1a" after the change with the "compressed data 1" of memory card 116, and acquires "difference 1" corresponding to the change content based on the comparison result. Differential backup execution unit 623 stores "compressed difference 1" obtained by compressing the "difference 1" in the predetermined storage area of main storage device 106 (step T3).

Backup management unit 620 compares the "compression difference 1" with the "compressed data 1" to calculate a ratio of the data amount of the "compression difference 1" to the data amount of the "compressed data 1", and compares the calculated ratio, namely, the change ratio with the threshold. When determining that the change ratio is less than or equal to the threshold based on the comparison result, backup management unit 620 does not cause differential backup execution unit 623 to execute the backup using the "compression difference 1". When determining that the change ratio exceeds the threshold, backup management unit 620 causes differential backup execution unit 623 to execute the backup based on the "compression difference 1" (step T4).

More specifically, backup management unit 620 calculates the required time backing up based on the "compression difference 1" based on the information amount of the "compression difference 1", the reading speed of main storage device 106, the writing speed of memory card 116, the processing time merging the "compression difference 1" with the "compressed data 1" of memory card 116, and the like, calculates N control cycles 70 required for the completion of the backup processing based on the mathematical division: (calculated required time/idle time 73 of each control cycle 70), calculates unit information amount M based on the mathematical division: (information amount/N of "compression difference 1"), and sets number N of cycles and unit information amount M as parameters (arguments) in differential backup program 1591. Here, merging includes acquiring data representing the "compression difference 1" by integrating programs or data represented by the "data 1a" and the "compressed data 1" into one according to a predetermined rule.

PLC 100 executes differential backup program 1591 in idle time 73 in each of N control cycles 70 using scheduler 640. Differential backup execution unit 623 implemented by executing differential backup program 1591 executes the merge processing of the difference between unit information amounts M while transferring the "compression difference 1" by unit information amount M in each idle time 73.

At a subsequent time T+n (n≥2), the backup and the merging processing are performed (steps T5, T6). More specifically, when change detector 601 detects the change of the "data 1", PLC 100 causes backup management unit 620 to determine whether the number of changes of the original "data 1" exceeds the threshold. When it is determined that the number of changes exceeds the threshold, differential backup execution unit 623 performs the backup and the merging processing. For example, when the threshold indicates two times, the backup and the merging processing are performed on the information of the "difference 1", "difference 2", and "difference 3" acquired by three changes and stored in the predetermined storage area of main storage device 106 (steps T5, T6).

In steps T5, T6, more specifically, PLC 100 calculates number N of control cycles 70 and unit information amount M by backup management unit 620. For example, backup management unit 620 calculates the required time for the backup. For example, the required time is calculated based on information amounts of the "difference 1", "difference 2", and "difference 3", the reading speed of main storage device 106, the writing speed of memory card 116, and the processing time merging the "difference 1", "difference 2", and "difference 3" into the "compressed data 1 of memory card 116. Then, backup management unit 620 calculates number N of control cycles 70 required for completion of the backup processing based on the mathematical division (calculated required time/idle time 73 of each control cycle 70). In addition, backup management unit 620 calculates unit information amount M based on the mathematical division: (total information amount/N of the "difference 1", "difference 2", and "difference 3"). Backup management unit 620 sets the calculated number of cycles N and unit information amount M as parameters (arguments) in the differential backup program 1591.

Scheduler 640 executes differential backup program 1591 in idle time 73 in each of N control cycles 70, and differential backup execution unit 623 implemented by executing differential backup program 1591 performs the merging processing while transferring the "difference 1", the "difference 2", and the "difference 3" by unit information amount M in idle time 73 of each of N control cycles 70.

When the total information amount of the "difference 1", the "difference 2", and the "difference 3" is greater than or equal to the upper limit threshold, instead of performing the merge processing while transferring the "difference 1", the "difference 2", and the "difference 3" by unit information amount M, the changed "data 1b" may be backed up by the procedure illustrated in steps T1, T2. In this case, the changed "data 1b" can be stored as "compressed data 2" in memory card 116 by being backed up.

With reference to FIG. 17, the differential backup will be described. When change detector 601 of PLC 100 detects the change of the base data ("object information"), backup management unit 620 counts up the number of detected changes (step S120).

PLC 100 compares the number of changes with the threshold using backup management unit 620 (step S121). When determining that the number of changes is less than or equal to the threshold based on the comparison result (YES in step S121), PLC 100 calculates the change ratio with respect to the base data (step S122). When PLC 100 compares the calculated change ratio with the threshold using backup management unit 620. When determining that the change ratio is less than or equal to the threshold based on the comparison result (YES in step S123), PLC 100 does not perform the differential backup. On the other hand, when determining that the number of changes exceeds the threshold based on the comparison result using backup management unit 620 (NO in step S121) or when determining that the change ratio exceeds the threshold using backup management unit 620 (NO in step S123), PLC 100 proceeds to step S124 for the backup.

In step S124, backup management unit 620 determines whether the backup setting information includes the "execution permission inquiry" (step S124). When backup management unit 620 determined that backup setting information 166 includes the "execution permission inquiry" (YES in step S124), backup notification unit 622 outputs the notification of the "execution permission inquiry" through HMI 280 to the user or support device 500 (step S125), and backup management unit 620 determines whether the backup execution is rejected based on the user operation received through HMI 280, support device 500, or the like (step S126).

In PLC 100, information management unit 610 determines whether backup setting information 166 includes the setting by the user of the "execution permission inquiry" (step S124). When it is determined that backup setting information 166 does not include the setting of the "execution permission inquiry" (NO in step S124), or when PLC 100 determines that the backup execution is not rejected based on the received user operation (NO in step S126), the processing proceeds to step S127. When determining that the backup execution is rejected based on the received user operation (YES in step S126), PLC 100 ends the processing.

In step S127, PLC 100 outputs, by backup notification unit 622, the notification indicating that the differential backup is started using the current base data to the user (step S127). PLC 100 resets a counter counting the number of changes, and starts the differential backup by differential backup execution unit 623 (step S128). In step S128, the differential backup in FIG. 18 is performed.

PLC 100 determines whether the differential backup is completed within a predetermined backup waiting time by backup management unit 620 (step S129, NO in step S130, NO in step S135).

When backup management unit 620 determines that the differential backup is completed within the backup waiting time (YES in S130), PLC 100 transmits notification frame 90A to network 11 to notify another PLC 100 of the successful backup using backup notification unit 622 (step S130*a*). PLC 100 determines whether the backup is successful based on whether notification frame 90A including the notification of the backup success is received from all other PLCs 100 using backup management unit 620 (step S131). When backup management unit 620 determines that the differential backup is not completed within the backup waiting time (YES in step S135) or determines that notification frame 90A including the notification of the backup success is not received from all other PLCs 100 (NO in step S131), PLC 100 outputs the notification of the backup failure to the user using backup notification unit 622 (step S136).

When backup management unit 620 determines that the differential backup is successful (YES in step S131), PLC 100 determines whether the backup to the upper system is set (step S132). More specifically, PLC 100 causes information management unit 610 to determine whether backup setting information 166 includes the user setting of the storage medium of "upper system" as the "backup destination medium", and PLC 100 determines whether the backup to the upper system is set based on the determination result.

When determining that the backup to the upper system is not set (NO in step S132), PLC 100 ends the differential backup processing. However, when determining that the backup to the upper system is set (YES in step S132), PLC 100 backs up object information 206 of main storage device 106 to the storage medium of the upper system, for example, storage 450 according to the processing procedure in FIG. 16 by backup management unit 620 including backup execution unit 621 (step S133). During the backup to the upper system, PLC 100 causes backup management unit 620 to set the state of object information 206 in main storage device 106 to "do not overwrite". However, when the backup to the upper system is completed, backup management unit 620 returns the state of object information 206 in main storage device 106 from "do not overwrite" to "overwriting is possible" such that the state can be changed (step S134).

M. Backup of Machine Learning Data

Object information 206 may include the machine learning data related to control of the object. The user can allow PLC 100 to back up the machine learning data during operation by operating the GUI in FIG. 24(C) presented on touch screen 288 of HMI 280.

Figure 19:
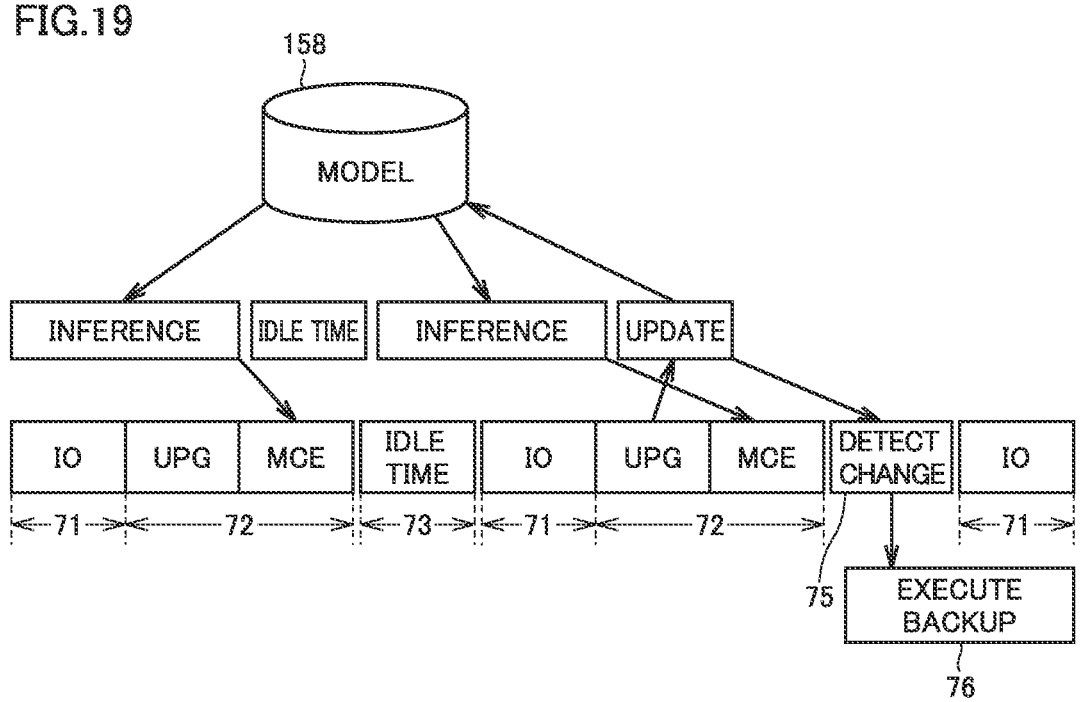
FIG. 19 is a view schematically illustrating backup of machine learning data according to the embodiment.

FIGS. 19 and 20 is views schematically illustrating the backup of the machine learning data of the embodiment. For example, the case where model data 158 is updated will be described. With reference to FIG. 19, in the embodiment, the inference processing using model data 158 and the update processing of model data 158 that are implemented by executing learning program 157 can be performed in a cycle independent of or different from control cycle 70 of IO refresh 71 and control arithmetic processing 72. The result of the inference processing is used, for example, in the control arithmetic processing 72 of the MCE, and the model data 158 is updated, for example, by the control arithmetic processing 72 of the UPG. When model data 158 is updated, change detector 601 detects that the information stored in main storage device 106 is changed (processing 75). Backup execution unit 621 executes the backup of object information 206 including model data 158 stored in main storage device 106 with the change detection as a trigger (processing 76).

With reference to FIG. 20, the case where the backup is performed every time model data 158 is updated will be described more specifically. With reference to FIG. 20, for example, model data 158 includes a variable model 15a in which the model data can be updated and a fixed model 15b in which the model data cannot be updated as the model data having different characteristic. Examples of the method for updating variable model 15a include the case where the variable model is autonomously changed by additional learning of the machine learning or the like, the case where the variable model is changed by downloading the model data from the external device to PLC 100, and the case where the variable model is changed by control arithmetic processing 72 of the UPG as illustrated in FIG. 19.

In FIG. 20, for model data 158, the first update is performed at time t1, the second update is performed at subsequent time t2, and the third update is performed at subsequent time t3 by different methods. Every time model data 158 is updated at times t1, t2, and t3, change detector 601 detects the change in object information 206, and backup execution unit 621 backs up object information 206. As a result, every time model data 158 is updated, model data 158 can be stored by the backup regardless of the update method. The data that can be updated among the machine learning data may be learning program 157, or both model data 158 and learning program 157.

Either the division backup by backup execution unit 621 or a differential backup by differential backup execution unit 623 can be used for the backup of the machine learning data.

Although the "backup destination medium" is previously designated by backup setting information 166, the "backup destination medium" may be changed. For example, when backup management unit 620 of PLC 100 determines that there is no more free space in the "backup destination medium" specified by backup setting information 166 and the backup cannot be made, backup notification unit 622 of PLC 100 may output the notification that the backup cannot be made to the user and output an advice including deleting old backup data 613 of the "backup destination medium" to the user.

N. Restoration

PLC 100 reads backup data 613 (see FIG. 9) stored (stored) in, for example, memory card 116 as the "backup destination medium" from memory card 116 and stores backup data 613 in main storage device 106, so that what is called the restoration in which object information 206 is restored in main storage device 106 can be performed.

Figure 21:
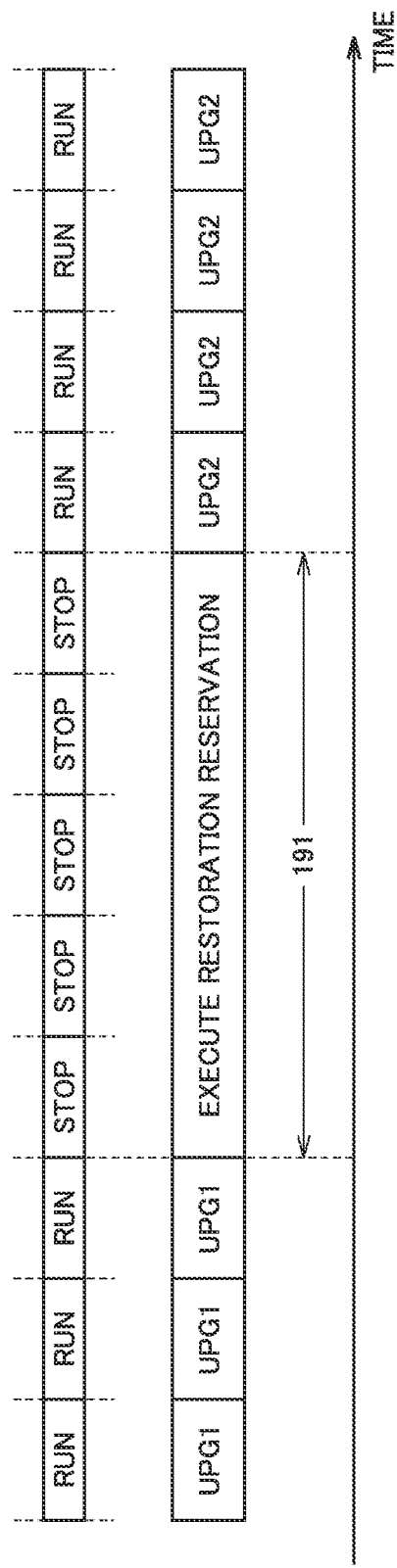
FIG. 21 is a view schematically illustrating time at which restoration is performed according to the embodiment.

FIG. 21 is a view schematically illustrating time at which the restoration is performed of the embodiment. Backup is performed when PLC 100 is in operation (when "RUN" in FIG. 21), whereas the restoration is performed at a time 191 when PLC 100 is not in operation (when "STOP" in FIG. 21). Time 191 can be reserved by reserved time 167 of restoration notification frame 90C.

For example, the non-operating time includes the time stopping control system 1 in order to replace field device 90 connected to network 110, the time stopping control system 1 due to frequent occurrence of defects and defects of a product, the time changing a production line in which control system 1 is provided, the time reproducing the same production line in another factory, the time stopping the production line to change a produced product or change a production amount of a product, and the like.

(n1. Restoration Processing)

In the embodiment, backup data 613 that is the restoration object is also referred to as "restoration object data". The user selects the "restoration object data" from backup management information 165 displayed by HMI 280 or support device 500.

Figure 22:
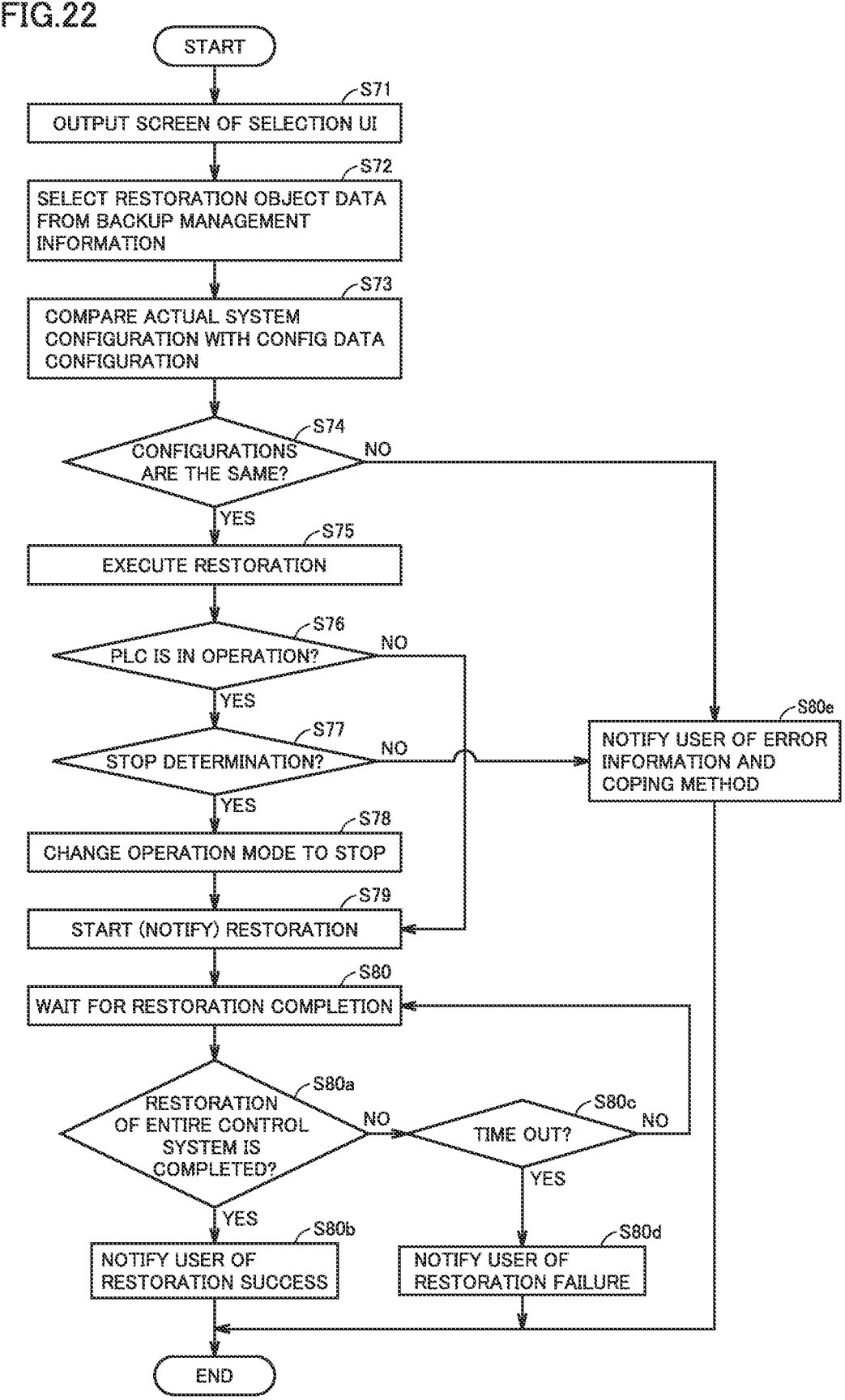
FIG. 22 is a flowchart illustrating restoration processing according to the embodiment.

FIG. 22 is a flowchart illustrating restoration processing of the embodiment. With reference to FIG. 22, PLC 100 causes restoration management unit 630 to display a selection screen selecting the "restoration object data" through HMI 280 or support device 500 (step S71).

FIG. 23 is a view illustrating an example of the selection screen of the "restoration object data" of the embodiment. In step S71, the GUI including the selection screen in FIG. 23 is displayed. On the selection screen, a list of records of backup management information 165 is displayed. The user performs the designation operation of the number of the record corresponding to the "restoration object data" in the list of number 1651 that is the identifier of the record on the selection screen with a pointer indicated by an arrow in the drawing or the like. PLC 100 receives the user's designation operation by restoration management unit 630 and determines backup data 613 of memory card 116 tied up to designated number 1651 as the "restoration object data" (step S72). In the GUI of FIG. 23, change time 1652 indicating the time when the information is backed up is associated with number 1651 of at least one piece of information that is backed up, so that the user can use associated change time 1652, reason 1658, or the like as a selection criterion. The GUI including the selection screen in FIG. 23 may be output to operation panel 129 of PLC 100. In this case, PLC 100 includes operation panel 129 as a display for displaying the UI indicating number 1651 that is the identifier of at least one piece of backed up object information 206 (backup data 613) and a circuit of input/output I/F 127 as an interface for receiving the user operation of designating the information about the restoration object from at least one piece of backed up object information 206 through operation panel 129.

For example, the GUI in FIG. 23 is displayed on display 481 of touch screen 288 by HMI 280. The GUI in FIG. 23 includes number 1651 identifying at least one piece of backed up information (backup data 613), change time 1652, and reason 1658. PLC 100 receives the user operation designating the information about the restoration object from among at least one piece of backed-up information by restoration management unit 630 through touch panel 48 or the like of touch screen 288.

PLC 100 determines whether the network configuration at the time of restoration is the same as the network configuration at the time of backup (step S74). More specifically, PLC 100 causes restoration management unit 630 to search memory card 116 as the "backup destination medium" based on the number designated by the user, and reads backup data 613 corresponding to number 1651 matched with the number designated by the user. PLC 100 compares the configuration indicated by config data 156 included in backup data 613 with the configuration indicated by current config data 156 (for example, config data 156 of secondary storage device 108) using restoration management unit 630 (step S73), and determines whether both the configurations are matched with each other based on the comparison result (step S74). When determining that both the configurations are not matched with each other (NO in step S74), PLC 100 outputs the notification advising the user of the error information and the coping method based on the determination result to the user through HMI 280 or support device 500 (step S80e) using restoration notification unit 632, and ends the processing.

When determining that both the configurations are matched with each other (YES in step S74), the restoration notification unit 632 generates restoration notification frame 90C requesting another PLC 100 to perform the restoration and transmits the frame to network 11 (step S75). In another PLC 100, restoration execution unit 631 specifies the "restoration object data" based on number 1651 of the identifier in body 92 of received restoration notification frame 90C and reserved time 167, and reserves time 191 performing the restoration. Thus, for backup data 613 in which the change is detected and backed up at the same time in all PLCs 100 time-synchronized with each other in control system 1, the same time 191 is reserved, and the restoration can be performed in the reserved time.

In PLC 100, restoration management unit 630 determines whether PLC 100 is in operation as a control system based on the operation mode of PLC 100 (step S76). When restoration management unit 630 determines that it is not in operation (NO in step S76), the processing proceeds to step S79. When determining that it is in operation (YES in step S76), restoration management unit 630 determines whether the operation as control system 1 of PLC 100 is stopped based on the operation mode of PLC 100 (step S77). PLC 100 or control system 1 can switch the operation mode from operation to stop based on the user operation.

When determining that control system 1 is not stopped (NO in step S77), PLC 100 outputs the notification advising the user of error information and a coping method based on determination to the user through HMI 280 or support device 500 using restoration notification unit 632 (step S80e).

When PLC 100 determines that the operation mode is not stop (YES in step S77), restoration management unit 630 switches the operation mode to the stop based on the user operation (step S78), and restoration execution unit 631 starts the restoration (step S79). More specifically, restoration execution unit 631 starts the restoration to main storage device 106 with backup data 613 designated by the user in step S72 as the "restoration object data", and restoration notification unit 632 transmits restoration notification frame 90C notifying the start of the restoration to another PLC 100 (step S79). When restoration management unit 630 of PLC 100 determines that the restoration of PLC 100 that is its own device is completed within a predetermined waiting time, restoration notification unit 632 of PLC 100 transmits the notification of the restoration completion to another PLC.

PLC 100 determines whether the restoration of entire control system 1 is completed based on whether the restoration of the own device is completed to receive frame 90A including the notification of the restoration completion from all other PLCs 100 within the predetermined waiting time using restoration management unit 630 (step S80, step S80a, NO in step S80c).

When determining that the restoration of entire control system 1 is completed (YES in S80a), PLC 100 causes restoration notification unit 632 to output the successful restoration notification to the user through HMI 280 or support device 500 (step S80b). When determining that the restoration of entire control system 1 is not completed (NO in S80a, YES in S80c), PLC 100 outputs the backup failure notification to the user through HMI 280 or support device 500 using backup notification unit 622 (step S80d).

In the processing of FIG. 22, the case where the "restoration object data" (backup data 613) is stored in the local storage medium (memory card 116) of PLC 100 has been described. However, when the same backup data 613 is stored in both the local storage medium and storage 450 of the upper system, backup data 613 of the local storage medium is basically set as the "restoration object data". When backup data 613 is not stored in the local storage medium but stored only in storage 450 of the upper system, backup data 613 of storage 450 of the upper system is set as the "restoration object data".

FIGS. 25 and 26 are views illustrating examples of the notification content to the user of the embodiment. FIG. 25 illustrates an example of a notification content 230 that can be presented in the backup, and FIG. 26 illustrates an example of notification content 240 that can be presented in the restoration.

These notifications include the reason for the execution of the backup accompanying the setting change and a countermeasure. For example, the countermeasure include a countermeasure against a change in the machine learning data. In addition, the countermeasure includes a countermeasure related to the execution and the setting of the restoration.

O. Program

The configuration in which processor 102 executes the program including backup management program 170 or restoration management program 180 to provide the backup or the restoration has been exemplified. However, a part or all of the provided configuration may be implemented using a dedicated hardware circuit (for example, an application specific integrated circuit (ASIC) or a field-programmable gate array (FPGA)). Alternatively, the main part of PLC 100 may be implemented using hardware according to a general-purpose architecture. In this case, the plurality of OSs having different uses may be executed in parallel using a virtualization technology, and the required application may be executed on each OS.

The program including backup management program 170 and restoration management program 180 is a medium that accumulates information such as the program by electric, magnetic, optical, mechanical, or chemical action such that the computer or other device such as secondary storage device 108, a machine, or the like can read the information such as the program recorded therein. Processor 102 may acquire the program related to the backup or restoration described above from these storage media. Alternatively, the program including backup management program 170 or restoration management program 180 may be supplied to PLC 100 by being downloaded through an upper network.

P. Advantage

Figure 27:
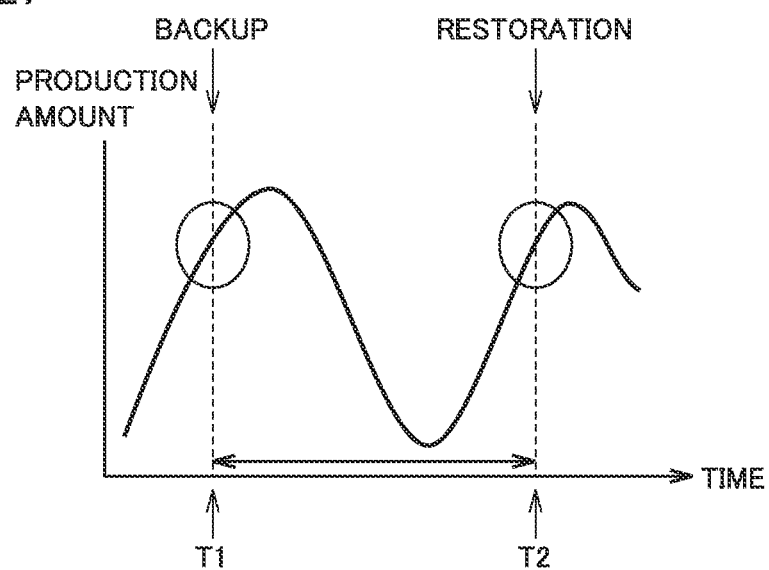
FIG. 27 is a view illustrating an advantage according to the embodiment.

FIG. 27 is a view illustrating an advantage of the embodiment. In the graph of FIG. 27, a vertical axis represents the production amount of the product by the production line including control system 1, and a horizontal axis represents time. The configuration of the production line, namely, the network configuration of control system 1 changes according to the change of the type of the product or the change of the production amount. For example, the type or the number of field devices 90 connected to PLC 100 is changed.

In such the background, when the configuration of the production line is changed to change the production amount from X to Y at time T2 in FIG. 27, there is a need for the user to reuse control program 154, setting data 155, and the like that are stored in main storage device 106 as control program 154 and setting data 155 when the same production amount is changed in the past (time T1 in FIG. 27).

In the embodiment, the backup is performed at time T1 to store backup data 613 including control program 154, setting data 155, and the like in the "backup destination medium", and at subsequent time T2, backup data 613 corresponding to time T1 (backup data 613 in which number 1651 in FIG. 9 is tied up to "3") is restored, so that the need can be satisfied.

FIG. 28 is a view illustrating the case where the time-synchronized backup data is acquired between PLCs 100 of the embodiment. FIG. 28 schematically illustrates the state in which backup data 613 is stored in time synchronization between PLC 100A and PLC 100B. In FIG. 28 (A), PLC 100A stores backup data 613 that is object information 206 backed up at each change time 1652 (corresponding to the change time in FIG. 9) in memory card 116 in association with each change time 1652. In FIG. 28 (B), PLC 100B stores backup data 613 that is object information 206 backed up at each change time 1652 in memory card 116 in association with each change time. In the embodiment, because PLCs 100A and 100B are time-synchronized, control system 1 can acquire backup data 613 individually acquired by different PLCs 100A and 100B (different processes) by making the time axis indicated by change time 1652 of backup data 613 substantially coincide between PLCs 100A and 100B. Accordingly, during the restoration, by designating change time 1652, PLC 100A and PLC 100B can restore backup data 613 corresponding to designated change time 1652. Although backup data 613 of PLC 100A and PLC 100B is illustrated in FIG. 28, backup data 613 of PLC 100C can be acquired while the time axis indicated by change time 1652 is almost completely matched with other PLCs 100A and 100B.

According to FIG. 28, in each PLC 100, after the backup processing is performed, backup data 613 of each PLC 100 can be tied up using change time 1652, but the tie-up method is not limited thereto. For example, in each PLC 100, when change detector 601 detects that object information 206 in main storage device 106 is changed at a predetermined time based on the synchronized time during the operation, backup execution unit 621 executes the backup processing of the information stored in main storage device 106. The predetermined time can include the time commonly designated by the user for all PLCs 100 through the UI. More specifically, for example, when one PLC 100 out of the plurality of PLCs 100 detects that object information 206 of the own device is changed during the operation, the notification indicating that a certain time (slightly ahead) based on the synchronized time is set as the specified time for which the backup processing is to be performed is transmitted to other PLCs 100. Thus, the plurality of PLCs 100 can simultaneously perform the backup processing in the specified time. The certain time (slightly ahead) based on this synchronized time may be set dynamically or statically. For example, the dynamic setting of the certain time can include the setting according to the length of idle time 73 of control cycle 70 during the operation. Furthermore, for example, the static setting of the certain time may include the setting based on the time specified by the user through the UI described above.

Accordingly, backup data 613 of each PLC 100 can be tied up at the predetermined time or the specified time simultaneously with the backup at the predetermined time or the specified time. Such the tie-up methods may be performed in appropriate combination.

According to the embodiment, a need to reproduce or duplicate the production line can also be med. Specifically, when a plurality of industrial machines including field device 90 are combined to form the production line, the plurality of PLCs 100 are connected by a network to operate one production line. The operation of the production line is sometimes adjusted by a person according to a variation in the production amount or an operation state of the industrial machine. In addition, with recent evolution of the machine learning, sometimes the machine learning data is autonomously adjusted by the machine learning mounted on PLC 100. There is a need to reproduce the state of the past production line or copy the production line while adjustment is performed according to the change in the production amount or the operation situation of the industrial machine in daily production. In this regard, in the embodiment, the control program controlling the plurality of industrial machines constituting the production line, the setting data for the control, and the data of the machine learning related to the control can be backed up as object information 206 in association with each other among the plurality of PLCs, so that it is possible to meet the need.

Q. Appendix

The above embodiment includes the following technical ideas.

[Configuration 1]

A control device (100, 100A, 100B, 100C) that controls an object (90), the control device including:
- a storage (106,108) configured to store information (206) controlling the object; and
- a change detector (601) configured to detect that information in the storage is changed,
- in which the control device executes backup processing of the information stored in the storage when the change detector detects that the information in the storage is changed during operation.

[Configuration 2]

The control device described in configuration 1, in which the change detector detects that the information is changed based on a user operation for the information stored in the storage.

[Configuration 3]

The control device described in configuration 1 or 2, in which the change detector detects that the information is changed based on a calculation value calculated from the information stored in the storage.

[Configuration 4]

The control device described in any one of configurations 1 to 3, in which the information stored in the storage includes at least one of a control program (154) controlling the object, setting data (155) for the controlling, and machine learning data (157, 158) related to the controlling.

[Configuration 5]

The control device described in any one of configurations 1 to 4, in which the control device is communicably connected to a network (110, 11) configuration including the object, and the information stored in the storage includes network configuration data (156) including identifiers of devices including the control device and the object connected to the network.

[Configuration 6]

The control device described in any one of configurations 1 to 5, in which the backup processing includes processing for copying information in the storage and storing the copied information in a storage medium, and
- the storage medium includes a storage medium comprised in an upper system (300) connected to the control device through a network.

[Configuration 7]

The control device described in any one of configurations 1 to 6, in which a plurality of the control devices are communicably connected to a network configuration (110, 11) including the object, and
- each of the control devices transmits a request (90B) causing another control device to execute the backup processing through the network configuration when detecting that the information stored in the storage of the own control device is changed.

[Configuration 8]

The control device described in configuration 7, in which the plurality of control devices perform time synchronization, and
- each of the plurality of control devices backs up the information in association with a time based on the synchronized time in the backup processing.

[Configuration 9]

The control device described in configuration 7 or 8, in which the plurality of control devices perform the time synchronization, and
- when the change detector of one control device of the plurality of control devices detects that the information in the storage of the own device is changed during operation, each of the plurality of control devices executes backup processing of the information stored in the storage of the own device at a specified time based on the synchronized time.

[Configuration 10]

The control device described in configuration 9, in which the one control device transmits a notification of the specified time to the other control devices when the change detector detects that the information in the storage of the own device is changed.

[Configuration 11]

The control device described in any one of configurations 1 to 10, further including:
- a processor (102); and
- a scheduler (640) configured to manage a plurality of programs executed by the processor according to a priority within a predetermined cycle (70),
- in which the plurality of programs managed by the scheduler include:
- a first program for first processing (71, 72) including the control processing, the first program having a high priority executed by the processor in the cycle; and
- a second program for second processing, the second program having a lower priority of the execution than the first program and being executed in an idle time (73) of the processor in the cycle,
- the first program includes a control program (154) controlling the object,
- the second program includes a backup program (170, 159) performing the backup processing, and
- the scheduler causes the processor to execute the backup program in the idle time of each of at least one cycle (N) in which a total length of the idle time of each cycle corresponds to a required time of the backup processing.

[Configuration 12]

The control device described in configuration 11, in which the control device further determines the at least one cycle in which the total length of the idle time of each cycle corresponds to the required time of the backup processing.

[Configuration 13]

The control device described in configuration 11 or 12, in which the control device further sets an information amount (M) of a backup object in the idle time in each cycle to the backup program based on the required time of the backup processing and the idle time.

[Configuration 14]

The control device described in any one of configurations 1 to 13, in which the backup processing includes a differential backup (623) that holds copying information obtained by copying the information in the storage, thereafter, derives difference information between the copying information and post-change information every time the information in the storage is changed, and integrates at least one piece of derived difference information and the copying information.

[Configuration 15]

The control device described in configuration 14, in which the differential backup integrates the at least one piece of difference information and the copying information when a number of subsequent changes exceeds a threshold.

[Configuration 16]

The control device described in configuration 14 or 15, in which the differential backup integrates the at least one piece of difference information and the copying information when a ratio of an information amount of the at least one piece of difference information to an information amount of the copying information exceeds a threshold.

[Configuration 17]

The control device described in any one of configurations 1 to 16, further including: a display (129) for displaying a UI indicating an identifier (1651) of the at least one piece of backed-up information; and
- an interface (127) for receiving a user operation designating information about a restoration object from the at least one piece of backed-up information.

[Configuration 18]

The control device described in configuration 17, in which the identifier of the at least one piece of backed-up information is associated with a time (1652) at which the information is backed up.

[Configuration 19]

The control device described in any one of configurations 1 to 18, in which the storage has a volatile storage area (106) that stores the information.

[Configuration 20]

A non-transitory machine readable storage medium containing a program executed by a processor (102) included in a control device (100, 100A, 100B, 100C) controlling an object (90), the control device including a storage (106, 108) storing information controlling the object, in which
- when the program is executed,
- the program causes the processor to:
- detect that the information in the storage is changed; and
- execute backup processing of the information stored in the storage in response to the detection that the information is changed when the control device is in operation.

It should be considered that the disclosed embodiment is an example in all respects and not restrictive. The scope of the present invention is defined by not the description of the embodiment, but the claims, and it is intended that all changes within the meaning and scope of the claims are included in the present invention.

REFERENCE SIGNS LIST

1: control system, 3A, 3B, 3C: process, 10: network system, 11, 12, 13, 14, 110: network, 70: control cycle, 71: IO refresh, 72: control arithmetic processing, 73: idle time, 90: field device, 90A: notification frame, 90B: change notification frame, 90C: restoration notification frame, 91: header, 92: body, 93: type, 94: destination, 95: sender, 101, 101A, 513: timer, 102: processor, 106: main storage device, 116, 420, 516: memory card, 120B, 206: object information, 152: scheduler program, 153: IO refresh program, 154: control program, 155: setting data, 156: configuration data, 157: learning program, 158: model data, 159: backup program, 160: change management program, 161: information management program, 162: backup notification program, 163: restoration program, 164: restoration processing program, 165: backup management information, 166: backup setting information, 167: reserved time, 170: backup management program, 172: restoration instruction, 180: restoration management program, 190: line management device, 280: HMI, 300: upper system, 380: manufacturing management device, 400: manufacturing execution system, 450: storage, 500: support device, 600: change management unit, 601: change detector, 602: change notification unit, 610: information management unit, 613: backup data, 620: backup management unit, 621: backup execution unit, 622: backup notification unit, 623: differential backup execution unit, 630: restoration management unit, 631: restoration execution unit, 632: restoration notification unit, 640: scheduler, 1591: differential backup program, 1650: change specification information, 1651: number, 1652: change time, 1653: change object group, 1654: change object, 1655: operation terminal, 1656: worker, 1657: whether backup is executed, n1658: reason, E1: storage area, M: unit information amount, N: number of cycles

The invention claimed is:

1. A control device that controls an object, the control device comprising:
a storage configured to store information for controlling the object;
a change detector configured to detect that the information in the storage is changed;
a first network controller configured to connect a first network configured to communicate between the control device and the object;
a second network controller configured to connect a second network configured to communicate between the control device and an upper system provided outside the control device;
a processor; and
a scheduler configured to manage a plurality of programs executed by the processor within a cycle,
wherein:
the control device executes backup processing of the information stored in the storage when the change detector detects that the information in the storage is changed during operation,
the backup processing includes processing for copying information in the storage and storing the copied information in a storage medium,
the storage medium includes a storage medium comprised in the upper system,
a communication protocol of the first network includes a protocol that guarantees a data arrival time,
the communication protocol of the first network is different from a communication protocol of the second network,
the plurality of programs managed by the scheduler include:
a control program that controls the object, and
a backup program that performs the backup processing,
the scheduler causes the processor to execute the control program within the cycle,
the scheduler causes the processor to execute the backup program in an idle time of the cycle,
the scheduler causes the processor to execute the backup program in the idle time of at least one cycle in which a total length of the idle time of the at least one cycle corresponds to a required time of the backup processing,
the control device calculates the required time for completion of the backup processing based on an information amount to be backed up included in the information stored in the storage, a reading speed of the storage, and a writing speed of a storage medium, and
the control device calculates a number N of the at least one cycle required for the completion of the backup processing based on the required time and the idle time of each cycle, N being greater than or equal to 1.

2. The control device according to claim 1, wherein the change detector detects that the information amount to be backed up is changed based on a user operation for the information stored in the storage.

3. The control device according to claim 1, wherein the change detector detects that the information amount to be backed up is changed based on a calculation value calculated from the information stored in the storage.

4. The control device according to claim 1, wherein the information stored in the storage includes at least one of the control program controlling the object, setting data for the controlling, and machine learning data related to the controlling.

5. The control device according to claim 1, wherein the control device is communicably connected to a network configuration including the object, and
the information stored in the storage includes network configuration data including identifiers of devices including the control device and the object connected to the network configuration.

6. The control device according to claim 1, wherein a plurality of the control devices are communicably connected in a network configuration including the object, and
each of the control devices transmits a request causing another control device to execute the backup processing through the network configuration when detecting that the information stored in the storage of the own control device is changed.

7. The control device according to claim 6, wherein the plurality of the control devices perform time synchronization, and
each of the plurality of control devices backs up the information in association with a time based on the time synchronization in the backup processing.

8. The control device according to claim 6, wherein the plurality of the control devices perform time synchronization, and
when the change detector of one control device of the plurality of the control devices detects that the information in the storage of the own device is changed during operation, each of the plurality of the control devices executes backup processing of the information stored in the storage of the own device at a specified time based on the time synchronization.

9. The control device according to claim 8, wherein the one control device transmits a notification of the specified time to other control devices of the plurality of the control devices when the change detector detects that the information in the storage of the own device is changed.

10. The control device according to claim 1, wherein:
the control program has a high execution priority by the processor in the cycle; and
the backup program has a lower execution priority than the control program.

11. The control device according to claim 10, wherein the control device further sets the information amount to be backed up in the idle time in each cycle to the backup program based on the required time of the backup processing and the idle time.

12. The control device according to claim 1, wherein the backup processing includes a differential backup that holds the copying information obtained by copying the information in the storage, thereafter, derives difference information between the copying information and post-change information every time the information in the storage is changed, and integrates at least one piece of the difference information with the copying information.

13. The control device according to claim 12, wherein the differential backup integrates the at least one piece of the difference information with the copying information when a number of subsequent changes exceeds a threshold.

14. The control device according to claim 12, wherein the differential backup integrates the at least one piece of the difference information with the copying information when a ratio of an information amount of the at least one piece of the difference information to an information amount of the copying information exceeds a threshold.

15. The control device according to claim 1, further comprising: a display for displaying a user interface (UI) indicating an identifier of at least one piece of the information that is backed up; and
an interface for receiving a user operation designating information about a restoration object from the at least one piece of the information that is backed up.

16. The control device according to claim 15, wherein the identifier is associated with a time at which the information is backed up.

17. The control device according to claim 1, wherein the storage has a volatile storage area that stores the information.

18. A non-transitory machine readable storage medium containing a program executed by a processor included in a control device controlling an object, the control device including a storage that stores information for controlling the object, a first network controller that connects a first network configured to communication between the control device and the object, a second network controller that connects a second network configured to communicate between the control device and an upper system provided outside the control device, a processor, and a scheduler configured to manage a plurality of programs executed by the processor within a cycle, the program, when executed by the processor, causing the processor to:
detect that the information in the storage is changed; and
execute backup processing of the information stored in the storage in response to the detection that the information is changed when the control device is in operation,
wherein:
the backup processing includes copying information in the storage and storing the copied information in a storage medium,
the storage medium includes a storage medium comprised in the upper system,
a communication protocol of the first network includes a protocol that guarantees a data arrival time,
the communication protocol of the first network is different than a communication protocol of the second network,
the plurality of programs managed by the scheduler include:
a control program that controls the object, and
a backup program that performs the backup processing,
the scheduler causes the processor to execute the control program within the cycle,
the scheduler causes the processor to execute the backup program in an idle time of the cycle,
the scheduler causes the processor to execute the backup program in the idle time of at least one cycle in which a total length of the idle time of the at least one cycle corresponds to a required time of the backup processing,
the program further causes the processor to calculate the required time for completion of the backup processing based on an information amount to be backed up included in the information stored in the storage, a reading speed of the storage, and a writing speed of a storage medium, and to calculate a number N of the at least one cycle required for the completion of the backup processing based on the required time and the idle time of each cycle, N being greater than or equal to 1.

19. The non-transitory machine readable storage medium according to claim 18, wherein the scheduler causes the processor to execute the backup program in the idle time of the number N of the at least one cycle to complete the backup processing within the required time.

20. The control device according to claim 1, wherein the scheduler causes the processor to execute the backup program in the idle time of the number N of the at least one cycle to complete the backup processing within the required time.

* * * * *